United States Patent
Moore et al.

(10) Patent No.: US 11,290,424 B2
(45) Date of Patent: *Mar. 29, 2022

(54) METHODS AND SYSTEMS FOR EFFICIENT NETWORK PROTECTION

(71) Applicant: Centripetal Networks, Inc., Portsmouth, NH (US)

(72) Inventors: Sean Moore, Hollis, NH (US); Jess Parnell, Grayson, GA (US); Jonathan R. Rogers, Hampton Falls, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/406,311

(22) Filed: May 8, 2019

(65) Prior Publication Data
US 2020/0106742 A1 Apr. 2, 2020

Related U.S. Application Data

(63) Continuation of application No. 16/030,374, filed on Jul. 9, 2018, now Pat. No. 10,333,898.

(51) Int. Cl.
*H04L 29/06* (2006.01)
*H04L 43/028* (2022.01)
*H04L 69/16* (2022.01)

(52) U.S. Cl.
CPC ........ *H04L 63/0236* (2013.01); *H04L 43/028* (2013.01); *H04L 63/1416* (2013.01);
(Continued)

(58) Field of Classification Search
CPC ....... H04L 63/02; H04L 63/0227–0263; H04L 63/14–1483; H04L 63/20; H04L 43/028; H04L 69/16
See application file for complete search history.

(56) References Cited

U.S. PATENT DOCUMENTS 6,098,172 A 8/2000 Coss et al.
6,147,976 A 11/2000 Shand et al.
(Continued)

FOREIGN PATENT DOCUMENTS

AU 2005328336 B2 9/2011
AU 2006230171 B2 6/2012
(Continued)

OTHER PUBLICATIONS

Umer et al, Towards Multi-Stage Intrusion Detection Using IP Flow Records, 2016.*
(Continued)

*Primary Examiner* — Minh Dinh
(74) *Attorney, Agent, or Firm* — Banner & Witcoff, Ltd.

(57) ABSTRACT

Methods and systems are disclosed for integrating cyber threat intelligence (CTI), threat metadata, and threat intelligence gateways with analysis systems to form efficient and effective system for active, proactive, and reactive network protection. A network gateway may be composed of multiple stages. A first stage may include a threat intelligence gateway (TIG). A second stage may include one or more cyber analysis systems that ingest TIG-filtered communications and associated threat metadata signals. A third stage may include network protection logic that determines which protective actions. The gateway may be provisioned and configured with rules that specify the network protection policies to be enforced. The gateway may ingest all communications flowing between the protected network and the unprotected network.

36 Claims, 12 Drawing Sheets

(52) U.S. Cl.
CPC .......... *H04L 63/1433* (2013.01); *H04L 63/20* (2013.01); *H04L 69/16* (2013.01); *H04L 63/0227* (2013.01)

(56) References Cited

U.S. PATENT DOCUMENTS

| | | |
|---|---|---|
| 6,226,372 B1 | 5/2001 | Beebe et al. |
| 6,279,113 B1 | 8/2001 | Vaidya |
| 6,317,837 B1 | 11/2001 | Kenworthy |
| 6,484,261 B1 | 11/2002 | Wiegel |
| 6,611,875 B1 | 8/2003 | Chopra et al. |
| 6,662,235 B1 | 12/2003 | Callis et al. |
| 6,826,694 B1 | 11/2004 | Dutta et al. |
| 6,971,028 B1 | 11/2005 | Lyle et al. |
| 7,089,581 B1 | 8/2006 | Nagai et al. |
| 7,095,716 B1 | 8/2006 | Ke et al. |
| 7,107,613 B1 | 9/2006 | Chen et al. |
| 7,143,438 B1 | 11/2006 | Coss et al. |
| 7,152,240 B1 | 12/2006 | Green et al. |
| 7,185,368 B2 | 2/2007 | Copeland, III |
| 7,215,637 B1 | 5/2007 | Ferguson et al. |
| 7,225,269 B2 | 5/2007 | Watanabe |
| 7,227,842 B1 | 6/2007 | Ji et al. |
| 7,237,267 B2 | 6/2007 | Rayes et al. |
| 7,263,099 B1 | 8/2007 | Woo et al. |
| 7,296,288 B1 | 11/2007 | Hill et al. |
| 7,299,353 B2 | 11/2007 | Le Pennec et al. |
| 7,331,061 B1 | 2/2008 | Ramsey et al. |
| 7,478,429 B2 | 1/2009 | Lyon |
| 7,499,412 B2 | 3/2009 | Matityahu et al. |
| 7,539,186 B2 | 5/2009 | Aerrabotu et al. |
| 7,610,621 B2 | 10/2009 | Turley et al. |
| 7,684,400 B2 | 3/2010 | Govindarajan et al. |
| 7,710,885 B2 | 5/2010 | Ilnicki et al. |
| 7,721,084 B2 | 5/2010 | Salminen et al. |
| 7,792,775 B2 | 9/2010 | Matsuda |
| 7,814,158 B2 | 10/2010 | Malik |
| 7,814,546 B1 | 10/2010 | Strayer et al. |
| 7,818,794 B2 | 10/2010 | Wittman |
| 7,849,502 B1 | 12/2010 | Bloch et al. |
| 7,913,303 B1 | 3/2011 | Rouland et al. |
| 7,954,143 B2 | 5/2011 | Aaron |
| 8,004,994 B1 | 8/2011 | Darisi et al. |
| 8,009,566 B2 | 8/2011 | Zuk et al. |
| 8,037,517 B2 | 10/2011 | Fulp et al. |
| 8,042,167 B2 | 10/2011 | Fulp et al. |
| 8,117,655 B2 | 2/2012 | Spielman |
| 8,156,206 B2 | 4/2012 | Kiley et al. |
| 8,176,561 B1 | 5/2012 | Hurst et al. |
| 8,219,675 B2 | 7/2012 | Ivershen |
| 8,271,645 B2 | 9/2012 | Rajan et al. |
| 8,306,994 B2 | 11/2012 | Kenworthy |
| 8,307,029 B2 | 11/2012 | Davis et al. |
| 8,331,234 B1 | 12/2012 | Newton et al. |
| 8,422,391 B2 | 4/2013 | Zhu |
| 8,495,725 B2 | 7/2013 | Ahn |
| 8,510,821 B1 | 8/2013 | Brandwine et al. |
| 8,726,379 B1 | 5/2014 | Stiansen et al. |
| 8,806,638 B1 | 8/2014 | Mani |
| 8,832,832 B1 | 9/2014 | Visbal |
| 8,856,926 B2 | 10/2014 | Narayanaswamy et al. |
| 8,935,785 B2 | 1/2015 | Pandrangi |
| 9,094,445 B2 | 7/2015 | Moore et al. |
| 9,124,552 B2 | 9/2015 | Moore |
| 9,137,205 B2 | 9/2015 | Rogers et al. |
| 9,154,446 B2 | 10/2015 | Gemelli et al. |
| 9,160,713 B2 | 10/2015 | Moore |
| 9,172,627 B2 | 10/2015 | Kjendal et al. |
| 9,419,942 B1 | 8/2016 | Buruganahalli et al. |
| 9,430,646 B1* | 8/2016 | Mushtaq ............ H04L 63/1425 |
| 9,531,672 B1 | 12/2016 | Li et al. |
| 9,634,911 B2 | 4/2017 | Meloche |
| 9,686,193 B2 | 6/2017 | Moore |
| 2001/0039579 A1 | 11/2001 | Trcka et al. |
| 2001/0039624 A1 | 11/2001 | Kellum |
| 2002/0016858 A1 | 2/2002 | Sawada et al. |
| 2002/0038339 A1 | 3/2002 | Xu |
| 2002/0049899 A1 | 4/2002 | Kenworthy |
| 2002/0083345 A1 | 6/2002 | Halliday et al. |
| 2002/0112188 A1 | 8/2002 | Syvanne |
| 2002/0152209 A1 | 10/2002 | Merugu et al. |
| 2002/0164962 A1 | 11/2002 | Mankins et al. |
| 2002/0165949 A1 | 11/2002 | Na et al. |
| 2002/0186683 A1 | 12/2002 | Buck et al. |
| 2002/0198981 A1 | 12/2002 | Corl et al. |
| 2003/0005122 A1 | 1/2003 | Freimuth et al. |
| 2003/0018591 A1 | 1/2003 | Komisky |
| 2003/0035370 A1 | 2/2003 | Brustoloni |
| 2003/0051026 A1 | 3/2003 | Carter et al. |
| 2003/0088787 A1 | 5/2003 | Egevang |
| 2003/0097590 A1 | 5/2003 | Syvanne |
| 2003/0105976 A1 | 6/2003 | Copeland |
| 2003/0120622 A1 | 6/2003 | Nurmela et al. |
| 2003/0123456 A1 | 7/2003 | Denz et al. |
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0154399 A1 | 8/2003 | Zuk et al. |
| 2003/0188192 A1 | 10/2003 | Tang et al. |
| 2003/0212900 A1 | 11/2003 | Liu et al. |
| 2003/0220940 A1 | 11/2003 | Futoransky et al. |
| 2004/0010712 A1 | 1/2004 | Hui et al. |
| 2004/0015719 A1 | 1/2004 | Lee et al. |
| 2004/0073655 A1 | 4/2004 | Kan et al. |
| 2004/0088542 A1 | 5/2004 | Daude et al. |
| 2004/0093513 A1 | 5/2004 | Cantrell et al. |
| 2004/0098511 A1 | 5/2004 | Lin et al. |
| 2004/0114518 A1 | 6/2004 | MacFaden et al. |
| 2004/0123220 A1 | 6/2004 | Johnson et al. |
| 2004/0131056 A1 | 7/2004 | Dark |
| 2004/0151155 A1 | 8/2004 | Jouppi |
| 2004/0172529 A1 | 9/2004 | Culbert |
| 2004/0172557 A1 | 9/2004 | Nakae et al. |
| 2004/0177139 A1 | 9/2004 | Schuba et al. |
| 2004/0193943 A1 | 9/2004 | Angelino et al. |
| 2004/0199629 A1 | 10/2004 | Bomer et al. |
| 2004/0205360 A1 | 10/2004 | Norton et al. |
| 2004/0250124 A1 | 12/2004 | Chesla et al. |
| 2005/0010765 A1 | 1/2005 | Swander et al. |
| 2005/0024189 A1 | 2/2005 | Weber |
| 2005/0071650 A1 | 3/2005 | Jo et al. |
| 2005/0108557 A1 | 5/2005 | Kayo et al. |
| 2005/0114704 A1 | 5/2005 | Swander |
| 2005/0117576 A1 | 6/2005 | McDysan et al. |
| 2005/0125697 A1 | 6/2005 | Tahara |
| 2005/0138204 A1 | 6/2005 | Iyer et al. |
| 2005/0138353 A1 | 6/2005 | Spies et al. |
| 2005/0141537 A1 | 6/2005 | Kumar et al. |
| 2005/0183140 A1 | 8/2005 | Goddard |
| 2005/0229246 A1 | 10/2005 | Rajagopal et al. |
| 2005/0249214 A1 | 11/2005 | Peng |
| 2005/0251570 A1 | 11/2005 | Heasman et al. |
| 2005/0283823 A1 | 12/2005 | Okajo et al. |
| 2005/0286522 A1 | 12/2005 | Paddon et al. |
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0118894 A1 | 5/2007 | Bhatia |

(56) References Cited

U.S. PATENT DOCUMENTS

| | | |
|---|---|---|
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0138938 A1 | 5/2009 | Harrison et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0262741 A1 | 10/2009 | Jungck et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0185055 A1 | 7/2011 | Nappier et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0106354 A1 | 5/2012 | Pleshek et al. |
| 2012/0113987 A1 | 5/2012 | Riddoch et al. |
| 2012/0240135 A1 | 9/2012 | Risbood et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0254766 A1 | 9/2013 | Zuo et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0337613 A1 | 11/2014 | Martini |
| 2014/0366132 A1 | 12/2014 | Stiansen et al. |
| 2015/0033336 A1 | 1/2015 | Wang et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0127417 A1 | 5/2016 | Janssen |
| 2016/0191558 A1 | 6/2016 | Davison |
| 2016/0205069 A1 | 7/2016 | Blocher et al. |
| 2016/0219065 A1 | 7/2016 | Dasgupta et al. |
| 2016/0285706 A1 | 9/2016 | Rao |
| 2016/0294870 A1 | 10/2016 | Banerjee et al. |
| 2016/0366099 A1 | 12/2016 | Jordan |
| 2017/0223046 A1 | 8/2017 | Singh |

FOREIGN PATENT DOCUMENTS

| | | |
|---|---|---|
| CA | 2600236 A1 | 10/2006 |
| CN | 101459660 A | 6/2009 |
| CN | 101651692 A | 2/2010 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2498442 A1 | 9/2012 |
| EP | 1864226 B1 | 5/2013 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |
| WO | 2012146265 A1 | 11/2012 |

OTHER PUBLICATIONS

S.M. Bellovin et al., "Network Firewalls", IEEE Communications Magazine, 50-57, 1994.

S. Goddard et al., "An Unavailability Analysis of Firewall Sandwich Configurations", Proceedings of the 6th IEEE Symposium on High Assurance Systems Engineering, 2001.

S. Suri et al., "Packet Filtering in High Speed Networks", Proceedings of the Symposium on Discrete Algorithms, 969-970, 1999.

Singh, Rajeev et al. "Detecting and Reducing the Denial of Service attacks in WLANs", Dec. 2011, World Congress on Information and Communication Technologies, pp. 968-973.

Statement RE: Related Application, dated Jul. 24, 2015.

Tarsa et al., "Balancing Trie-Based Policy representations for Network Firewalls," Department of Computer Science, Wake Forest University, pp. 1-6 (2006).

U. Ellermann et al., "Firewalls for ATM Networks", Proceedings of INFOSEC'COM, 1998.

V. Srinivasan et al., "Fast and Scalable Layer Four Switching", Proceedings of ACM SIGCOMM, 191-202, 1998.

V.P. Ranganath, "A Set-Based Approach to Packet Classification", Proceedings of the IASTED International Conference on Parallel and Distributed Computing and Systems, 889-894, 2003.

(56) References Cited

OTHER PUBLICATIONS

W.E. Leland et al., "On the Self-Similar Nature of Ethernet Traffic", IEEE Transactions on Networking, 2(1); 15, 1994.

W.E. Smith, "Various Optimizers for Single-Stage Productions", Naval Research Logistics Quarterly, 3: 59-66, 1956.

X. Gan et al., "*LSMAC* vs. *LSNAT*: Scalable Cluster-based Web servers", Journal of Networks, Software Tools, and Applications, 3(3): 175-185, 2000.

Ylonen, et al., "The Secure Shell (SSH) Transport Layer Protocol," SSH Communication Security Corp, Newtork Working Group RFC 4253, Jan. 2006, 32 pages.

Mar. 11, 2019 U.S. Final Office Action—U.S. Appl. No. 16/030,354.

Feb. 21, 2019 U.S. Final Office Action—U.S. Appl. No. 15/382,806.

Mar. 18, 2019 (AU) First Examination Report—App. 2016379156.

Mar. 8, 2019 U.S. Notice of Allowance and Fees Due—U.S. Appl. No. 16/030,374.

Oct. 4, 2018 U.S. Notice of Allowance—U.S. Appl. No. 15/827,477.

Sep. 27, 2018 (WO) International Search Report and Written Opinion—App. PCT/US2018/043367.

Sep. 4, 2018 (WO) International Search Report and Written Opinion—App. PCT/US2018/041355.

Sep. 27, 2018 U.S. Non-Final Office Action—U.S. Appl. No. 15/614,956.

Feb. 6, 2019 U.S. Final Office Action—U.S. Appl. No. 15/413,750.

Feb. 6, 2019 U.S. Notice of Allowance and Fees Due—U.S. Appl. No. 16/039,896.

Jan. 24, 2019 U.S. Notice of Allowance—U.S. Appl. No. 15/610,995.

Mar. 8, 2019 U.S. Notice of Allowance and Fees Due—U.S. Appl. No. 16/060,374.

A. Feldmann et al., "Tradeoffs for Packet Classification", Proceedings of the IEEE INFOCOM, 397-413, 2000.

A. Hari et al., "Detecting and Resolving Packet Filter Conflicts", Proceedings of IEEE INFOCOM, 1203-1212, 2000.

Acharya et al, "OPTWALL: A Hierarchical Traffic-Aware Firewall," Department of Computer Science, Telecommunications Program, University of Pittsburgh, pp. 1-11 (2007).

Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.

Blake, et al., "An Architechture for Differentiated Services," Network Working Group RFC 2475, Dec. 1998, 36 pages.

C. Benecke, "A Parallel Packet Screen for High Speed Networks", Proceedings of the 15th Annual Computer Security Applications Conference, 1999.

Chen, et al., "Research on the Anomaly Discovering Alogrithm of the Packet Filtering Rule Sets," Sep. 2010, First Intemtional Conferernce on Pervasive Computing, Signal Processing and Applications, pp. 362-366.

D. Comer, "Analysis of a Heuristic for Full Trie Minimization", ACM Transactions on Database Systems, 6(3): 513-537, Sep. 1981.

D. Decasper et al., "Router Plugins: A Software Architecture for Next-Generation Routers", IEEE/ACM Transactions on Networking, 8(1): Feb. 2000.

D. Eppstein et al., "Internet Packet Filter Management and Rectangle Geometry", Proceedings of the Symposium on Discrete Algorithms, 827-835, 2001.

E. Al-Shaer et al., "Firewall Policy Advisor for Anomaly Discovery and Rule Editing", Proceedings of the IFIP/IEEE International Symposium on Integrated Network Management, 2003.

E. Al-Shaer et al., "Modeling and Management of Firewall Policies", IEEE Transactions on Network and Service Management, 1(1): 2004.

E. Fulp et al., "Network Firewall Policy Tries", Technical Report, Computer Science Department, Wake Forest University, 2004.

E. Fulp, "Optimization of Network Firewall Policies Using Ordered Sets and Directed Acyclical Graphs", Technical Report, Computer Scient Department, Wake Forest University, Jan. 2004.

E. Fulp, "Preventing Denial of Service Attacks on Quality of Service", Proceedings of the 2001 DARPA Information Survivability Conference and Exposition II, 2001.

E.L. Lawler, "Sequencing Jobs to Minimize Total Weighted Completion Time Subject to Precedence Constraints", Annals of Discrete Mathematics, 2: 75-90, 1978.

E.W. Fulp, "Firewall Architectures for High Speed Networks", U.S. Department of Energy Grant Application, Funded Sep. 2003.

Fulp, "Trie-Based Policy Representations for Network Firewalls," Proceedings of the IEEE International Symposium on Computer Communications (2005).

G. Brightwell et al., "Counting Linear Extensions is #P-Complete", Proceedings of the Twenty-Third Annual ACM Symposium on Theory of Computing, 1991.

G.V. Rooij, "Real Stateful TCP Packet Filtering in IP Filter", Proceedings of the 10th USENIX Security Symposium, 2001.

Greenwald, Michael; "Designing an Academic Firewall: Policy, Practice, and Experience with SURF"; IEEE, Proceedings of SNDSS, 1996.

J. Xu et al., "Design and Evaluation of a High-Performance ATM Firewall Switch and Its Applications", IEEE Journal on Selected Areas in Communications, 17(6): 1190-1200, Jun. 1999.

J.K. Lenstra et al., "Complexity of Scheduling Under Precedence Constraints", Operations Research, 26(1): 22-35,1978.

Kindervag, et al. "Build Security Into Your Network's DNA: The Zero Trust Network Architecture," Forrester Research Inc.; Nov. 5, 2010, pp. 1-26.

L. Qui et al., "Fast Firewall Implementations for Software and Hardware-Based Routers", Proceedings of ACM Sigmetrics, Jun. 2001.

Lee et al., "Development Framework for Firewall Processors," IEEE, pp. 352-355 (2002).

M. Al-Suwaiyel et al., "Algorithms for Trie Compaction", ACM Transactions on Database Systems, 9(2): 243-263, Jun. 1984.

M. Christiansen et al., "Using IDDs for Packet Filtering", Technical Report, BRICS, Oct. 2002.

M. Degermark et al., "Small Forwarding Tables for Fast Routing Lookups", Proceedings of ACM SIGCOMM, 4-13, 1997.

Mizuno et al., A New Remote Configurable Firewall System for Home-use Gateways, Jan. 2005. Second IEEE Consumer Communications and Networking Conference, pp. 599-601.

Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.

Nichols, et al., "Definition of the Differentiated Services Field (DS Field) in the IPv4 and IPv6 Headers," Network Working Group RFC 2474, Dec. 1998, 20 pages.

O. Paul et al., "A full Bandwidth ATM Firewall", Proceedings of the 6th European Symposium on Research in Computer Security ESORICS'2000, 2000.

P. Warkhede et al., "Fast Packet Classification for Two-Dimensional Conflict-Free Filters", Proceedings of IEEE INFOCOM, 1434-1443, 2001.

Palo Alto Networks; "Designing a Zero Trust Network With Next-Generation Firewalls"; pp. 1-10; last viewed on Oct. 21, 2012.

Perkins, "IP Encapsulation with IP," Network Working Group RFC 2003, Oct. 1996, 14 pages.

R. Funke et al., "Performance Evaluation of Firewalls in Gigabit-Networks", Proceedings of the Symposium on Performance Evaluation of Computer and Telecommunication Systems, 1999.

R. Rivest, "On Self-Organizing Sequential Search Heuristics", Communications of the ACM, 19(2): 1976.

R.L. Graham et al., "Optimization and Approximation in Deterministic Sequencing and Scheduling: A Survey", Annals of Discrete Mathematics, 5:287-326, 1979.

Reumann, John; "Adaptive Packet Filters"; IEEE, 2001, Department of Electrical Engineering and Computer Science, The University of Michigan, Ann Arbor, MI.

"Control Plane Policing Implementation Best Practices"; Cisco Systems; Mar. 13, 2013; <https://web.archive.org/web/20130313135143/http:www.cisco.com/web/about/security/intelligence/coppwp_gs.html>.

(56) References Cited

OTHER PUBLICATIONS

"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—U.S. Office Action—U.S. Appl. No. 11/390,976.
Sep. 14, 2009 U.S. Office Action—U.S. Appl. No. 11/316,331.
Apr. 29, 2010—U.S. Interview Summary—U.S. Appl. No. 11/390,976.
Aug. 20, 2010—(AU) Office Action—App 2005328336.
Jun. 23, 2010—U.S. Final Rejection—U.S. Appl. No. 11/316,331.
Mar. 26, 2010—U.S. Final Rejection—U.S. Appl. No. 11/390,976.
Sep. 10, 2010—(AU) Office Action—App 2006230171.
Sep. 30, 2010—U.S. Office Action—U.S. Appl. No. 11/390,976.
Apr. 27, 2011—(WO) International Search Report and Written Opinion—App PCT/US2010/054520.
Aug. 25, 2011—U.S. Non Final Rejection—U.S. Appl. No. 12/871,806.
Feb. 14, 2011—(EP) Search Report—App 06758213.0.
Jun. 9, 2011—U.S. Notice of Allowance—U.S. Appl. No. 11/390,976.
Mar. 3, 2011—(EP) Communication Pursuant to Rules 70(2) and 70a(2)—App 06758213.0.
Mar. 4, 2011—U.S. Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—U.S. Non Final Rejection—U.S. Appl. No. 12/871,806.
Feb. 6, 2012—U.S. Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—U.S. Final Rejection—U.S. Appl. No. 12/871,806.
Apr. 4, 2013—U.S. Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—U.S. Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—U.S. Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—U.S. Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015—U.S. Notice of Allowance—U.S. Appl. No. 14/702,755.
Sep. 30, 2019 (WO) International Search Report and Written Opinion of International Searching Authority—Application No. PCT/US2019/040830.
Apr. 15, 2016—U.S. Notice of Allowance—U.S. Appl. No. 14/855,374.
Apr. 26, 2016—U.S. Office Action—U.S. Appl. No. 14/745,207.
Dec. 5, 2016—U.S. Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—U.S. Non Final Office Action—U.S. Appl. No. 14/253,992.
Jan. 11, 2016—U.S. Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—U.S. Office Action—U.S. Appl. No. 14/921,718.
Jun. 9, 2016—(WO) International Search Report—PCT/US2016/026339.
Jun. 14, 2016—U.S. Office Action—U.S. Appl. No. 14/625,486.
Jun. 16, 2016—(CA) Office Action—App 2,888,935.
May 6, 2016—U.S. Office Action—U.S. Appl. No. 14/714,207.
May 13, 2016—U.S. Office Action—U.S. Appl. No. 13/940,240.
Nov. 21, 2016—U.S. Office Action—U.S. Appl. No. 14/745,207.
Oct. 5, 2016—U.S. Notice of Allowance—U.S. Appl. No. 14/698,560.
Oct. 26, 2016—U.S. Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—U.S. Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—U.S. Notice of Allowance—U.S. Appl. No. 14/625,486.
Feb. 15, 2017—U.S. Notice of Allowance—U.S. Appl. No. 14/921,718.
Oct. 4, 2018 U.S. Non-Final Office Action—U.S. Appl. No. 16/030,374.
Jun. 7, 2017—U.S. Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 U.S. Notice of Allowance—U.S. Appl. No. 14/690,302.
Nov. 3, 2017 U.S. Non-Final Office Action—U.S. Appl. No. 15/413,834.
Oct. 17, 2017 (WO) International Preliminary Report on Patentability—App. PCT/US2016/026339.
Sep. 29, 2017 (CA) Examination Report—App. 2,772,630.
Apr. 17, 2018 U.S. Non-Final Office Action—U.S. Appl. No. 15/610,995.
Aug. 29, 2018 (CA) Office Action—App. 2,888,935.
Aug. 9, 2018 U.S. Non-Final Office Action—U.S. Appl. No. 15/413,947.
Dec. 18, 2018 U.S. Final Office Action—U.S. Appl. No. 15/610,995.
Jul. 13, 2018 U.S. Notice of Allowance—U.S. Appl. No. 15/414,117.
Jul. 27, 2018 U.S. Non-Final Office Action—U.S. Appl. No. 15/382,806.
Jul. 5, 2018 U.S. Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Aritcle 94(3) EPC—App. 15722292.8.
Mar. 21, 2018 (AU) First Examination Report—App. 2015382393.
Mar. 8, 2018 U.S. Non-Final Office Action—U.S. Appl. No. 14/745,207.
May 25, 2018 U.S. Notice of Allowance—U.S. Appl. No. 15/413,834.
Nov. 14, 2018 U.S. Final Office Action—U.S. Appl. No. 14/745,207.
Oct. 12, 2018 U.S. Non-Final Office Action—U.S. Appl. No. 16/039,896.
Sep. 30, 2021—(CN) Office Action—App. No. 201980055472.8.

* cited by examiner

METHODS AND SYSTEMS FOR EFFICIENT NETWORK PROTECTION

CROSS-REFERENCE TO RELATED APPLICATION

This application is a continuation of and claims priority to co-pending U.S. patent application Ser. No. 16/030,374, filed Jul. 9, 2018, and entitled "METHODS AND SYSTEMS FOR EFFICIENT NETWORK PROTECTION." The entire contents of which are incorporated by reference herein in their entirety and made part hereof.

Aspects described herein generally relate to computer hardware and software and network security. In particular, one or more aspects of the disclosure generally relate to computer hardware and software for efficient, high-fidelity, low-latency cyber analysis of network communications, which may be applied to protecting TCP/IP networks from Internet-borne threats and attacks.

BACKGROUND

Network security is becoming increasingly important as the information age continues to unfold. Network threats/attacks may take a variety of forms, including unauthorized requests or data transfers, viruses, malware, large volumes of traffic designed to overwhelm resources, and the like. A variety of automated cyber analysis systems have been developed to protect networks against such network threats. In practice, cyber analysis systems are often operated in a highly inefficient manner.

Conventional network protection solutions, such as network firewalls and network intrusion detection systems, are often too inefficient and slow to actively and proactively protect networks from modern Internet-borne cyber threats and attacks; thus, those solutions are unable to effectively protect enterprise networks. These systems detect network threats by analyzing network communications using signature-based methods, anomaly-based methods, behavioral-based methods, intelligence-based methods, malware analysis methods, and the like. Often, these cyber analysis systems are used to reactively defend networks, e.g., detecting and mitigating threats/attacks after they have occurred.

In TCP/IP networks, a communication is a (usually bi-directional) flow of packets between two endpoints, and may be characterized by the L3/L4 "5-tuple" of source and destination IP addresses, source and destination ports, and L4 protocol type (e.g., TCP, UDP, etc.). Conventional solutions may log all packet communications crossing the enterprise network perimeter, which may be often located at the boundary between the protected network and the Internet. Packets may also be captured, copied, and/or stored, for use in subsequent cyber analysis. Stored logs may be searched for communications that are potential threats/attacks. The stored packets may be input into automated cyber analysis systems that search for signatures and behaviors that indicate potential threats. Automated cyber analysis systems are usually not deployed as inline systems because they may decrease network performance to unacceptable levels as traffic load increases.

Any potential threats may be reported to human cyber analysts, who either (a) determine that communications may be a threat, and identify any remedial actions that may mitigate the threat; or (b) determine that the communications may not be a threat; or (c) make no determination because, for example, there may be insufficient information to make a determination, or, for example, they do not investigate a threat due to the overwhelming volume of potential threats in their work queues.

Because confirmed threats/attacks typically represent less than 1% of the volume of enterprise communications with the Internet, a conventional solution approach can be highly inefficient, slow, and inaccurate. The large majority of available time and resources may be wasted searching through and analyzing legitimate (non-threat, benign) communications. Furthermore, many actual threats are not discovered because the diversity and complexity of threats make it difficult to generate search criteria and analysis rules and algorithms that detect all of them. Search criteria and analysis rules may identify relatively large volumes of legitimate communications as potential threats, which may further increase inefficiencies and inline processing lag (e.g., the time interval spanning the time instant when a threat communications occurred and the time when the threat communications was detected, confirmed, and remediated). Also, increases in the volume and complexity of search criteria and analysis rules may cause significant increases in latency. As a result, despite potentially large capital and operational expenditures on conventional network protection solutions, many actual threats are never discovered, or discovered long after any asset damage, loss, and theft have occurred.

Accordingly, there is a need for efficient and performant operation of cyber analysis systems that will significantly improve the effectiveness of network protection systems. In particular, there is a need for efficient and accurate network protection systems that can actively detect and mitigate threats and associated attacks.

SUMMARY OF THE INVENTION

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to efficient and performant operation of cyber analysis systems for use in protecting networks from cyber threats. These systems may also be used (a) to actively protect networks, for example, by detecting and then blocking a threat/attack as the associated network communications may be occurring; (b) to proactively protect networks, for example, by preventing a threat/attack communications from occurring (e.g., by preventing the threat/attack from breaching the network perimeter in either direction); and (c) to reactively protect networks by, for example, detecting ex post facto solutions when malware has been downloaded and/or detonated.

A network protection system (NPS) may be modeled as a gateway that interfaces a protected network (e.g., a private enterprise network) and an unprotected network (e.g., the Internet). The NPS gateway may be composed of three stages. The first stage may include a threat intelligence gateway (TIG). The second stage may include one or more cyber analysis systems that ingest TIG-filtered communications and associated threat metadata signals. The third stage may include network protection logic that determines which protective actions to take based on the threat metadata signaled by the first stage and second stage. Operationally, the NPS gateway may be provisioned and configured with rules that specify the network protection policies to be enforced. The NPS gateway may ingest all communications flowing between the protected network and the unprotected network.

The NPS gateway may filter all of the communications through the first-stage TIG, which may triage the communications into, for example, zero threat-risk communications, non-zero threat-risk communications, and 100% threat-risk communications. The first-stage TIG may generate threat metadata for each threat and/or communication, or for a portion thereof. The first-stage TIG may forward zero threat-risk communications to their destinations, may block 100% risk communications, and may forward non-zero threat-risk communications and their associated threat metadata signals to the second-stage. Based on the threat metadata, the first-stage TIG or another element of the NPS may select which (second-stage) cyber analysis systems may be used to process each non-zero threat-risk communication.

The first stage threat intelligence gateway (TIG) may be provided as inline filters for TCP/IP packet communications. Communications that match with cyber threat intelligence (CTI), which may be network addresses in the form of IP addresses, domain names, URLs, etc., may be filtered for further processing by other stages. The TIG operates to triage the communications by their potential threat risk, to determine which communications may need additional processing and which communications may not need to be further processed. The TIG may also generate threat metadata for each communication. The metadata signals may be used to signal the second stage and/or third stage or may be used in the further processing performed by the second and/or third stages such as the generation of additional metadata.

The second-stage cyber analysis systems may process the communications to further triage the communications into actual threat/attack communications and benign/legitimate communications, may update the threat metadata associated with the communications, and may forward the benign/legitimate communications to their intended destinations.

The second stage may include one or more cyber analysis systems that ingest TIG filtered communications and associated threat metadata signals, perform complex analyses on the communications, determine whether the communications may be actual threats/attacks or non-threat/benign, legitimate communications, and update the threat metadata signals. A plurality of second-stage cyber analysis systems may be differentiated by some combination of the type of analysis methods (e.g., signature-based, behavior-based, statistics-based, etc.) and the types of threats and attacks that the cyber analysis systems analyze.

Both the first-stage TIG and the second-stage cyber analysis systems may be configured with rules that specify the network protection policies that they enforce. The TIG may be provisioned with rules generated from CTI and CTI metadata supplied by multiple external/$3^{rd}$-party CTI providers, as well as by internal sources including the NPS gateway itself. The second-stage cyber analysis systems may be provisioned with rules similarly generated from CTI and CTI metadata and other threat detection data supplied by multiple external/$3^{rd}$-party providers, as well as by internal sources including the NPS gateway itself. The second-stage cyberanalysis systems may also be provisioned with intrusion detection system (IDS) signature rules, which define patterns to be detected.

For the communications that may be threats/attacks, depending on the results of first- and second-stage processing and associated threat metadata, and the configurable network protection policies, the NPS gateway takes additional actions in the third stage. The third stage may include network protection logic or one or more devices that ingest communications from the one or more cyber analysis systems. The third stage may also ingest metadata or other information from the first stage. The third stage may determine which protective actions to take based on the threat metadata signaled by the first stage and second stage, including transmitting signals to management devices or transmitting packets to their intended destinations.

The NPS gateway may actively protect the network, for example, by blocking a threat/attack communication (e.g., dropping the communication packets) as the threat/attack may be occurring. The NPS gateway may proactively protect the network, for example, by extracting CTI from a threat/attack communication and then configuring the first-stage TIG to filter future communications against the CTI. This proactive threat filtering may prevent threats/attacks from occurring by blocking the communications before the threats/attacks penetrate the network perimeter, in either direction. The NPS gateway may also reactively protect the network, for example, by identifying and reporting hosts that have downloaded malware and/or may be infected by malware so that, for example, authorities or other systems can remove the malware from the infected hosts.

Compared to conventional approaches, the NPS gateway may realize high efficiency and resultant improved performance, increased fidelity, and improved network protections. To improve system efficiency and performance, the first-stage TIG may only forward those communications that have non-zero threat risk (as computed by the TIG) to the second-stage cyber analysis system(s). In practice, only a small percentage of network communications have non-zero threat risk. Thus, the second-stage cyber analysis systems only process a small percentage of the network communications that inline cyber analysis systems would otherwise process in conventional network protection solutions. Further efficiencies may be gained by using first-stage threat metadata to select which cyber analysis system(s) (e.g., which analysis methods and types) should be applied to each (non-zero or medium threat risk) communication passed to the second stage. By significantly reduced loading and/or reduced scope of analysis methods and types, performance of the second-stage cyber analysis systems may be significantly increased and should, in many cases, be sufficient to enable active protections.

The NPS gateway may improve CTI fidelity with analysis response. The CTI applied by the TIG may not properly identify targeted threats or attacks in the sense that communications that match the CTI may be not necessarily actual threats or attacks, but may be instead non-malicious/benign, legitimate communications. The second-stage cyber analysis system(s) may improve the fidelity of communications output of the first-stage TIG by determining which of the CTI-matching communications may be actual threats/attacks and which may be non-malicious/benign, legitimate communications.

The NPS gateway may improve network protections in several ways that will be apparent from the detailed description that follows. The NPS gateway may block some malicious communications that may not be blocked by a (first-stage) TIG acting alone or a (second-stage) cyber analysis system acting alone. TIGs may be configured to allow some portion of communications that match low-fidelity CTI when network administrators/operators would rather allow a malicious communication than block a legitimate communication. Conversely, some cyber analysis systems, such as network intrusion detection systems (NIDS), may not be operated inline (and therefore cannot block malicious communications), because inline cyber analysis would add unacceptable latency and possibly packet drops to the communications. That is, the processing load of analyzing substantially all network traffic across many different analysis methods and types, many of which may not be relevant to the current communication being analyzed, would slow the delivery of all traffic.

An NPS gateway, however, may forward a TIG-filtered, low-fidelity CTI-matching communications and associated threat metadata to a second-stage cyber analysis systems. For example a network intrusion detection system may be configured to signature-analyze only a portion of network traffic based on the type of threat/attack signaled in the threat metadata. By lowering the traffic volume and narrowing the scope of analysis methods and types of each of a plurality of detection systems, the NIDS may be operated inline without introducing unacceptable latencies to the communications and/or unnecessarily dropping packets. Thus, if the NIDS determines that a communication may be malicious, then those systems may actively block such communications.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith. Some features herein are illustrated by way of example, and not by way of limitation, in the figures of the accompanying drawings, in which like reference numerals refer to similar elements.

FIG. 4 illustrates a process in which the NPS gateway forwards zero-risk, benign/legitimate traffic without expending resources unnecessarily on cyber analysis.

FIG. 5 illustrates a process in which the NPS gateway blocks high-risk threat communications without expending resources unnecessarily on cyber analysis.

FIG. 6 illustrates a process in which the NPS gateway processes a benign/legitimate communication matching CTI through multiple stages.

FIG. 7 illustrates a process in which the NPS gateway processes a threat communication matching CTI through multiple stages.

FIG. 8 illustrates a process in which the NPS gateway processes a communications through multiple stages.

FIG. 9 illustrates a process in which the NPS gateway processes a copy of a benign/legitimate communication CTI matching communication through multiple stages.

FIG. 10 illustrates a process in which the NPS gateway processes a copy of a threat communication CTI matching communication through multiple stages.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. These connections are general and, unless specified otherwise, may be direct or indirect, wired or wireless, physical or logical (virtual/software-defined). In this respect, the specification is not intended to be limiting.

Figure 1:
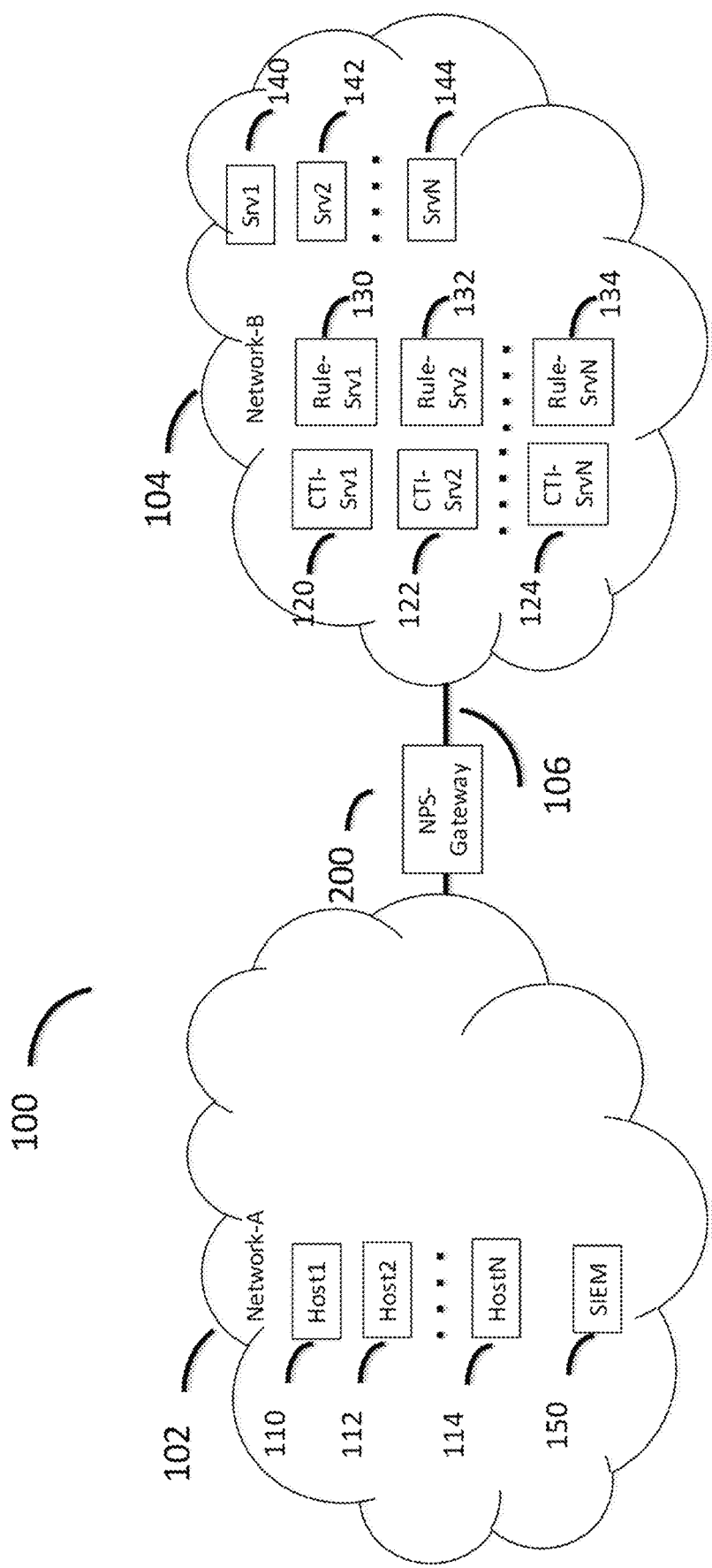
FIG. 1 depicts an illustrative environment for an NPS gateway that is protecting one network (e.g., an enterprise network) from threats and attacks borne by a second network (e.g., the Internet), in accordance with one or more aspects of the disclosure.

In accordance with embodiments of the disclosure, and referring to FIG. 1, which shows a representative environment 100, a network protection system (NPS) 200 may function as a gateway interfacing a protected network 102, such as a private enterprise network, and an unprotected network 104, such as the Internet. Networks 102 and 104 may be connected by link 106. The NPS gateway 200 may be physical or virtual, and the networks' intraconnections and interconnections 106 may be wired, wireless, and/or software defined.

The NPS gateway 200 may protect network 102 by filtering and analyzing all communications between hosts, for example 110, 112, and 114, connected to network 102 that have been assigned network addresses associated with network 102; and hosts, for example 140, 142, and 144, connected to network 104 that have been assigned network addresses associated with network 104. Endpoint applications, for example web browsers (HTTP clients), executing on hosts 110, 112, and 114 may communicate with endpoint applications, including web servers (HTTP servers), executing on hosts 140, 142, and 144. These communications may be transported over the link 106 connecting network 102 and network 104. NPS gateway 200 may be provisioned inline with link 106 in order to inspect and to potentially act on any communications.

Figure 2:
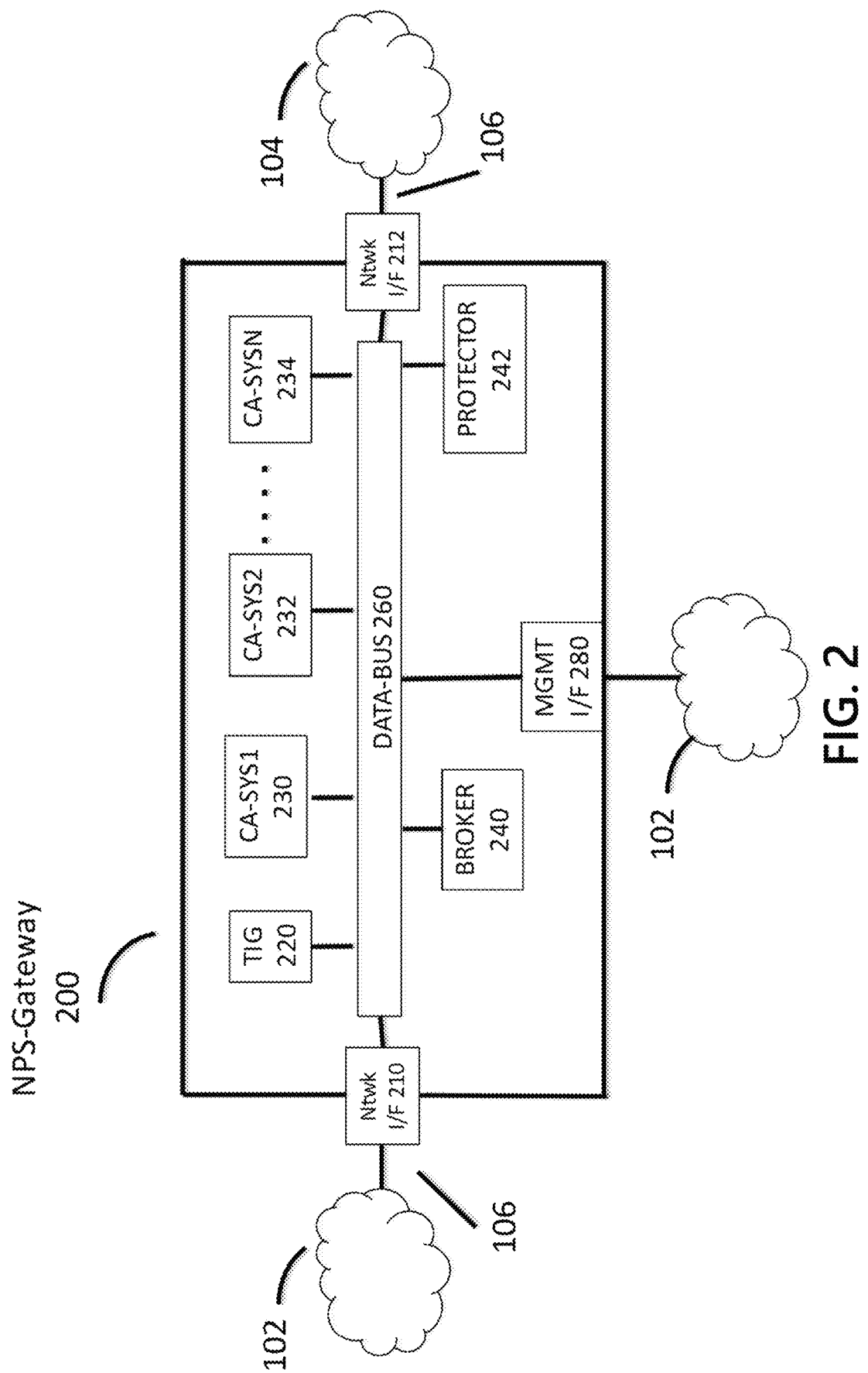
FIG. 2 depicts the functional and system components of an NPS gateway.

As described elsewhere in more detail, the NPS gateway 200 includes one or more threat intelligence gateways (TIGs) 220, as shown in FIG. 2, as a functional component. TIGs may be commercially available from a variety of vendors. A TIG 220 may be an inline TCP/IP packet filter that applies packet filtering rules to packet traffic, wherein the packet filtering rules have been derived from cyber threat intelligence (CTI) and from CTI metadata. CTI may include Internet network addresses—in the form of IP addresses, IP address ranges, L3/L4 ports and protocols, domain names, URLs, and the like—of resources controlled/operated by threat actors. CTI metadata may be, for example, the threat type, the threat name, the threat risk score, the threat actor, and the like. If a rule's CTI value(s) matches a packet, then the TIG applies the rule's disposition to the packet. A rule's disposition may be an action or actions to be applied to a matching packet, such as block/drop, allow/forward, log, capture, re-direct, mirror (copy, then forward and re-direct), and the like. Dispositions may be combined, for example, a packet may be simultaneously allowed, logged, captured, and re-directed. The collection of rules that a TIG 220 applies to packet traffic may be called a network protection policy, and may be set by a network administrator or operator.

The CTI used to derive TIG packet filtering rules may be supplied by one or more CTI provider services. In FIG. 1, these CTI provider services may host one or more CTI servers 120, 122, and 124. Those CTI servers may provide to or be accessed by a TIG 220 to download and update local CTI databases. The CTI provider services may also provide metadata associated with the CTI, for example, the names and types of threats/attacks, threat actors, threat risk values/reputation scores, and other data associated with each unit of CTI. A TIG 220 may determine packet filtering rules based on the CTI and CTI metadata, and may apply the rules to network packet traffic. A unit of CTI, sometimes called an Indicator of Compromise (IoC), may be supplied by multiple different CTI providers, in which case the names of the multiple different CTI providers may be included in the threat metadata of the associated rule. That is, cyber threat intelligence based on the same threat data may be supplied from one or more different CTI providers. When a communication matches one or more rules, the threat metadata of the matching rule may be used to signal other logical components of the NPS gateway, for example, to make decisions regarding handling, processing, and/or reporting of the (threat) communication.

Similarly, the NPS gateway 200 may include one or more cyber analysis systems (shown as 230-234 in FIG. 2) as functional components. A wide variety of such systems, for example network intrusion detection (NIDS) and network intrusion protection systems (NIPS), malware analysis systems, and other cyber analysis systems may be provisioned in the NPS gateway 200. These cyber analysis systems may also be configured with rules, which may be supplied by rule servers 130, 132, and 134 hosted by various providers and services. The NPS gateway 200 cyber analysis systems 230-234 may access these servers, download analysis rules and metadata associated with the rules, and apply the analysis rules to network communications.

The output of the NPS gateway 200 includes log files that report communications information and the NPS gateway actions and threat metadata related to protecting the network. These log files may be processed by a security information and event monitoring (SIEM) device such as the SIEM device 150 connected to network 102. The SIEM device 150 may include an application that may be operated by the administrators of network 102 who may be responsible for protecting network 102. The log files may be inspected and analyzed with a SIEM application to allow an administrative user to make changes to the handling of certain types of threats.

FIG. 2 depicts a system component diagram of an NPS gateway 200. Network interfaces 210 and 212 connect to internetwork link 106, which connects the protected network 102 and the unprotected network 104. Although not required, in practice the network interfaces 210 and 212 may be transparent in that they do not have L3 network addresses or L2 network addresses, and thus are not directly addressable. Network interfaces 210 and 212 connect to the data bus 260. The data bus 260 provides a communications channel between all system components of the NPS gateway 200. Data bus 260 transports content (communication packet flows) and signal (threat metadata) between the components. Note that the data bus 260 may not solely be an integrated/embedded data bus of a printed circuit board (PCB), but may also be, for example, an L2/L3 switched network, L3 routed network, L2/L3 network links connecting logical components, and the like, in any combination. The data bus may be wired, wireless, physical, logical, virtual, software-defined, etc., in any combination.

Similarly, the system components may be any combination of (co-resident) processes or applications executing on the same host, processes executing on different hosts, processes executing on virtual infrastructure, such as a hypervisor, or other arrangement of components and software. The management interface 280 may connect to a local network such as network 102 and has an L3 address. Thus, the management interface 280 may enable communications between the components of the NPS gateway 200 and L3-addressable hosts connected to networks 102 and 104. For example, when the TIG 220 may download CTI data and associated metadata supplied by CTI server 120, then the CTI server 120 may send L3 packets to the L3 IP address of the management interface 280, which may send them to TIG 220 via the data bus 260. The other components connected to data bus 260 may include: a threat intelligence gateway 220; one or more cyber analysis systems 230, 232, and 234; a broker 240 that may decide which cyber analysis systems may be applied to a communications; and a network protector 242 that may decide which protective actions to apply to a communications.

Figure 3:
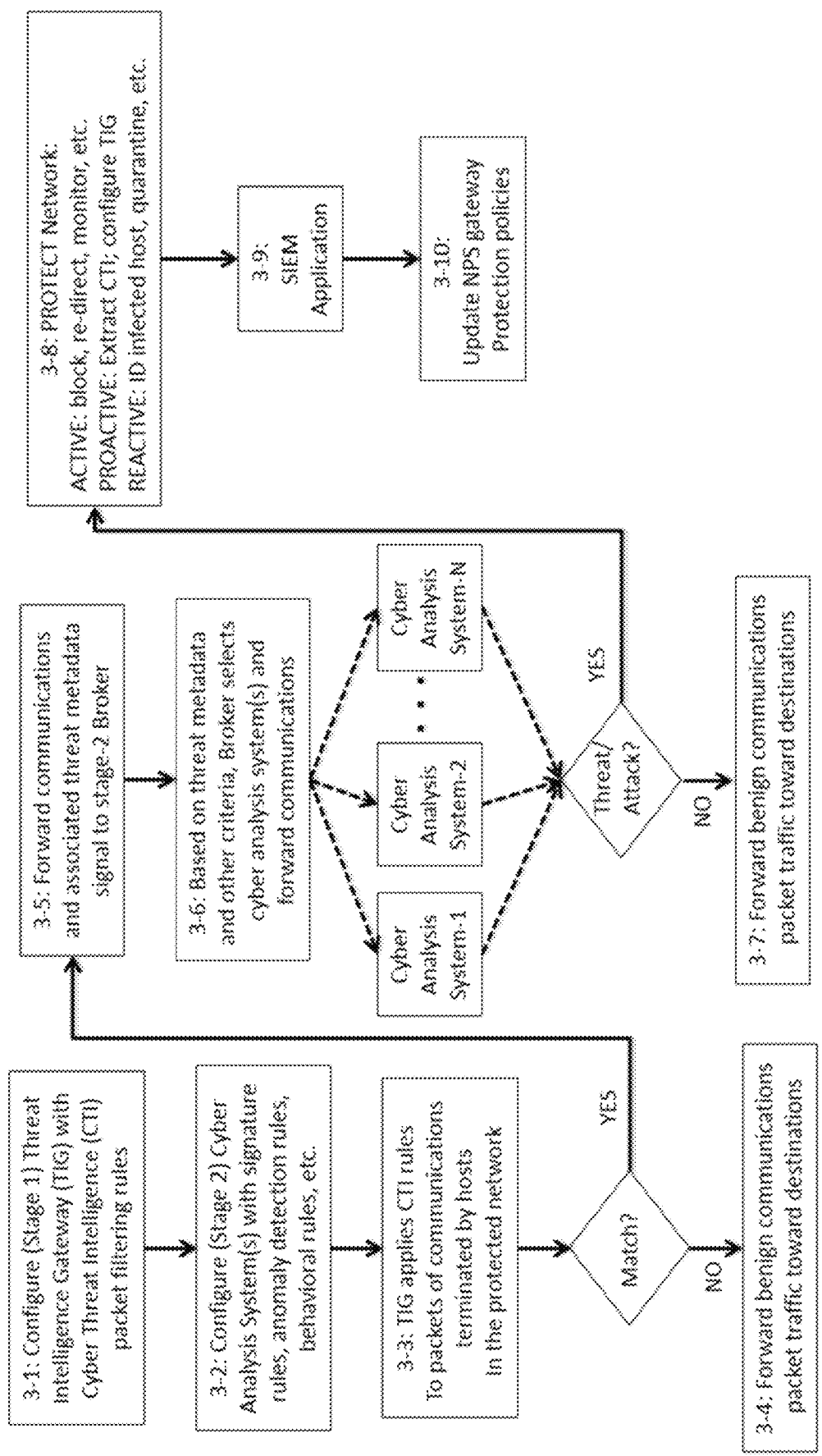
FIG. 3 depicts a flowchart of the operation of the NPS gateway.

FIG. 3 shows a representative operational block diagram/flowchart of the NPS gateway 200 that may function to protect a network, for example network 102, from threats/attacks borne by the unprotected network, for example external network 104. Referring to FIG. 3, in Step 3-1 the threat intelligence gateway (TIG) 220 may be configured with packet filtering rules generated from cyber threat intelligence (CTI) and CTI metadata, which may by supplied (via the management interface 280) by CTI servers 120, 122, and 124 that may be hosted by one or more CTI provider organizations. The CTI may comprise network addressing data—IP addresses, ports, protocols, domain names, URIs, and the like—of resources that may be operated/controlled by threat actors, as determined by the CTI providers organizations. CTI providers may enrich their CTI with threat metadata, such as the type of threat, the name of the threat, the identity of the actors associated with the threat, the discovery date of the threat, a risk score for the threat, a remedial action for the threat, the CTI provider name and other provenance information, and the like. This threat metadata may be included with the CTI when it is downloaded to the TIG 220. The TIG 220 may determine and may generate packet filtering rules from the CTI. Threat metadata may be associated with the rules so that it can be included in any signal messages between NPS gateway components and in any log files that record the (threat) communication events and associated actions by the NPS gateway. A TIG may also use the CTI threat metadata to determine the structure of rules, for example, the threat risk score(s) of the CTI provider(s) associated with a unit of CTI may be used to select the disposition (e.g., block, allow, re-direct, etc.) of the associated rule.

The volume of communications in the first stage TIG 220 second threat category ("non-zero threat risk") is typically much smaller than the volume of communications in the first threat category ("zero threat risk"). As such, the network protection system realizes significant efficiency gains by analyzing (in the second stage) only the communications in the second category. By reducing traffic load on the second-stage analysis systems, and by selectively applying the second-stage analysis systems based on threat metadata signaled by the first stage, some of the second-stage analysis systems may be operated inline without decreasing network performance to unacceptable levels.

In Step 3-2, similar to Step 3-1, cyber analysis systems 230, 232 and 234 included in the NPS gateway 200 may be configured with analysis rules—signature analysis rules, anomalous behavior analysis rules, and the like—supplied by rule servers 130, 132, 134, hosted by cyber analysis rule provider organizations. Similar to CTI providers, cyber analysis rule providers may enrich their rules with threat analysis metadata, such as the type of threat, the name of the threat, the identity of the actors associated with the threat, a threat/attack severity score, provenance information, and the like. When the cyber analysis systems 230, 232, and 234 report analysis results for a communication, threat metadata associated with the communication may be updated or associated with threat analysis metadata generated by the associated cyber analysis system. The threat analysis metadata may be included in any log files for the communication.

The first-stage TIG may be expected to operate inline even under heavy traffic loads. Thus, the triage process TIG may be expected to be time-efficient and resource-efficient as well as performant relative to the operational environment. In Step 3-3, in a first stage of the NPS gateway 200, the TIG 220 applies the CTI-generated filtering rules to triage all communications between, for example, endpoint hosts 110, 112, 114 and endpoint servers 140, 142, 144 into three categories.

A first threat category of communications, that do not match the CTI, may be considered to have low, no, or zero threat risk, including legitimate or benign communications. The TIG 220 may expedite processing of communications considered to have low, no, or zero threat risk, and ensure that those communications are forwarded to their intended destinations with a minimal delay. A second threat category of communications, that may match the CTI, may be considered to have medium or non-zero threat risk. A medium or non-zero threat risk may include all packets not assessed to be no-risk packets or high risk packets. If an assessed risk is measured between 0 (no-risk, legitimate, or benign communications) and 1 (confirmed threat/attack), then this second category of medium or non-zero threat risk may span the risk spectrum from very low risk (close to 0) to very high risk (close to 1). Communications with a medium or non-zero threat risk may be potentially, but not necessarily (e.g., due to low-fidelity CTI), actual threat/attack communications. A third threat category of communications may match CTI rules associated with a block disposition. Such communications may be considered as high or 100% threat-risk communications. Those communications are associated with or are highly likely to be associated with known or actual threats/attacks. The TIG 220 may drop or block communications determined to be part of this third category with high or 100% risk, thereby proactively protecting the network.

The second stage refines the fidelity of the CTI used in the first stage, such that the output of the network protection system includes minimal false positives; thus, consumers (e.g., network authorities) of the NPS gateway results do not waste any resources investigating communications that are not threats/attacks, or designing and implementing protection policies that are not needed/do not improve the network's security position. The second-stage fidelity refinements further improve network protections. Cybersecurity administrators operating (first-stage) a TIG 220 may generally not block communications that match low-fidelity CTI, because of the likelihood that legitimate communications will be blocked, which may harm their business. This means, however, that certain threat/attacks may also not be blocked. By routing such communications that match low-fidelity CTI through (second-stage) a cyber analysis system 230-234 that are configured to block true positives (actual threats/attacks) and allow false positives (legitimate/benign communications), then malicious communications that would not have been blocked by a network protected by only a TIG 220 are blocked by a network protected by an NPS gateway 200. High-fidelity CTI may be extracted from true positives/malicious communications that are detected by second-stage cyber analysis systems. This high-fidelity CTI may then be used to configure the TIG 220 to block on communications that match the high-fidelity CTI. For example, a (first-stage) TIG 220 may match a communication with a low-fidelity IP address range, but because of the low fidelity of the CTI, the TIG 220 may be configured to allow the communication but report it and copy/capture it for further, deeper analysis by the second stage. A second-stage cyber analysis may determine that the communication contains a URL for a malware file. The (high-fidelity) URL may be mapped into a filtering rule that may be used to configure the TIG 220 to block communications that contain the URL.

In Step 3-4, communications in the first threat category (with "zero threat risk" values) egress the NPS gateway 200 via the network interfaces 210 and 212 and continue toward their destinations.

In Step 3-5, for each communication in the second threat category (with "non-zero threat risk" values), the TIG 220 may generate and associate (initial) threat metadata to the communication. The threat metadata may include the threat metadata associated with the CTI rule that matches the communication, such as the type and name of the threat (for example, as labeled by the CTI provider(s)), the identity of the threat actor (if known), the CTI providers' identities, provenance information, the risk score(s) assigned by the CTI providers of the rule CTI, and other threat metadata provided from outside sources. The threat metadata may also include additional threat metadata computed by the TIG 220, such as the dispositions of each rule, a TIG 220 computed threat risk score (which may be derived in part from the threat risk score(s) and metadata supplied by the CTI provider(s) of the matching CTI), a threat event ID, and other NPS gateway 200 determined data. The TIG 220 may then forward the communication and the associated threat metadata signal to a second stage of the NPS gateway 200, which may be managed by a broker 240. The TIG 220 may generate or update a (flow) log for the communication event. The threat metadata may be included in the (flow) log for the communications event, which uses a standard format such as syslog so that the log can be readily processed by, for example, a security information and event management (SIEM) platform. The log data may also be sent to external devices and applications, such as the SIEM device 150 connected to the network 102, via the management interface 280.

The second-stage of the network protection system may further resolve any low-fidelity CTI of the first stage. That is, the second-stage cyber analysis systems 230, 232, and 234 may triage the communications into false positives (benign or legitimate communications) and true positives (communications associated with confirmed threats or attacks). As noted above in the Step 3-1 description, CTI providers may supply CTI in the form of network addresses, which can be IP address ranges (typically represented in CIDR notation), individual IP addresses, "5-tuples" (some combination of L3/L4 source and destination IP addresses, source and destination ports, and protocol type), fully qualified domain names (FQDNs), URIs, and the like. CTI fidelity may be a measure of the likelihood that a single unit of CTI (a network address) maps to a single malicious resource. For example, an absolute URL typically maps to a single resource and, thus, a URL may be considered high-fidelity CTI. As such, a communication matching a CTI specified URL may be considered highly likely to be an actual threat/attack.

Conversely, a single IP address may map to many resources, of which only a few may be malicious. In general, given a CTI fidelity measuring function Fidelity( ) the CTI fidelity comparison/ordering hierarchy may be: Fidelity(IP address range)<Fidelity(IP address)<Fidelity(5-tuple)<Fidelity(FQDN)<Fidelity(URL). For example, a single physical web server, which may be operated by a web site hosting service, may host multiple virtual domains (e.g., multiple web sites). Each of the domain names of the web sites resolve to the same IP address in the Internet domain name server (DNS), namely the IP address of the web server. The domain names may change as the service operator adds or drops clients, adds or drops domains and domain names, modifies domain deployments across a virtualized environment, and make other changes to the system. Among its many legitimate clients, the hosting service provider may be unwittingly providing hosting services to domains/sites operated by threat actors. Thus, some (small) portion of the web server communications may be malicious, but the rest of the communications are legitimate/benign. However, all of the web server communications, both malicious and legitimate, may be associated with the IP address of the web server. Thus, the IP address does not have high CTI fidelity, because the IP address may map to multiple resources, with only some portion of the resources being malicious. To determine if a communication associated with the IP address may be malicious or legitimate/benign, further analysis may be required. The second stage of the NPS gateway 200 performs such analyses.

The second stage may be composed of a collection of one or more automated cyber analysis systems 230, 232, and 234, which are differentiated by the threat analysis methods. The cyber analysis systems may apply different types of analysis, such as—signature analysis, anomalous behavior analysis, malware execution analysis, and the like—that the cyber analysis systems apply to communications, and by the types of threats/attacks that the cyber analysis systems analyze. As cyber threats/attacks are continually evolving, rules being implemented by the cyber analysis systems need to similarly evolve for the cyber analysis systems to be effective detectors. Such dynamic rules may be supplied by (external) providers that specialize in developing threat/attack detection rules and associated metadata, as in Step 3-2 described above. For example, a network intrusion detection system (NIDS) applies signature (pattern-matching) rules to communications to detect threats/attacks. A NIDS may also apply other types of rules and attack detection methods to communications, such as statistical anomaly-based detection, stateful network protocol analysis detection, and the like.

The second-stage NIDS analysis systems may be operated inline (sometimes called network intrusion prevention systems, or NIPS). A single NIDS applying serially all types of rules and analysis and detection methods, which may incur unacceptably high latencies that adversely affect network performance. In order to reduce latency, multiple NIDS systems may be executing concurrently. One of more of the plurality of NIDS may perform operations based on different sets of rules and analysis and detection methods. For example, a first NIDS 230 in the NPS gateway 200 may be configured with rules for detecting threats/attacks on the Domain Name System (DNS), while another NIDS 232 may be configured with rules for detecting threats/attacks on SNMP (Simple Network Management Protocol); and still other NIDS may be configured with other rule/analysis methods. The second stage may also include cyber analysis systems that are not designed to be operated inline. For example, malware analysis sandboxes that "detonate" suspect executable files and then observe behaviors to confirm maliciousness (or not) and gather cyber threat intelligence information on the suspected malware. This intelligence may be, for example, the URL of a botnet command and control server that the malware attempts to contact. The gathered cyber threat intelligence data may be fed back to the TIG 220 as a proactive defense action, as shown in Step 3-8.

In Step 3-6, a broker 240 at the front end of the second stage receives the communications and associated threat metadata from the first stage. Based on the associated threat metadata and other criteria, for example the application-level protocol (e.g., DNS, HTTP, HTTPS, SNMP, NTP, RTP, etc.), the broker 240 decides which of the one or more cyber analysis systems 230, 232, and 234 will be applied to each communication. The broker 240 may also signal and configure the cyber analysis system(s) to apply a particular analysis method and rule set, then forwards each communication to the selected set of cyber analysis systems. The second-stage cyber analysis systems may determine if the communications are true positives (actual threats/attacks) or false positives (no threat), and may update logs associated with the communications to include the analysis results. The cyber analysis system(s) may also update the threat metadata with threat analysis metadata, such as threat/attack severity scores, threat/attack type, name, actor identity, rule provider name, and the like. The logs for each communication may also include threat event IDs, which may be same value as the threat event ID produced by the first-stage TIG 220. Similar to the first stage, the logs should use a standard format such as syslog, so that the logs can be readily processed by, for example, a SIEM 150. The logs are associated with communications, and may be sent to external devices or applications, such as the SIEM 150 connected to network 102, via the management interface 280.

The second stage triages the communications into a true positives category (actual threats/attacks) and a false positives category (legitimate/benign communications). If the second-stage analysis systems applied to the communications are being operated inline, for example if the systems are functioning as NIPS, then in Step 3-7, communications that are false positives (e.g., benign/legitimate communications) may be safely forwarded to their destinations in the networks 102 and 104 interfaced by the NPS gateway 200. For communications that are true positives (e.g., actual attacks/threats), in Step 3-8 the NPS Gateway protection system 242 acts to protect the network.

Protections may be active, proactive, and/or reactive. Active protections may be, for example, blocking the communications, redirecting the communications to a sinkhole, forwarding but monitoring the communications, and the like. Proactive protections may be, for example, extracting CTI from the communications (e.g., URLs, domain names, ports, etc.), generating new rules based on the CTI, and re-configuring the TIG 220 with new rules. Proactive protections also may be, for example, changing the dispositions of existing rules. Reactive protections may be, for example, identifying malware-infected hosts and reporting those malware-infected hosts to network authorities. Protection system 242 or outside network authorities may malware-sweep the hosts, and/or quarantine malware-infected hosts. The TIG 220 may be configured with rules that block any network communications with source or destination IP addresses of a host identified as a malware-infected host. Protection system 242 may update the threat metadata and the logs, and may forward the logs to external applications via management interface 280.

In Step 3-9, the SIEM application or device reports the threat communications and NPS gateway 200 actions to network authorities, cyberanalysts, compliance officers, and/or other network administrators for review. In Step 3-10, the network authorities et al. may decide to take actions to further increase network protections or further mitigate threats, for example, by updating network protection policies.

FIGS. 4, 5, 6, 7, 8, 9, and 10 depict illustrative event sequences for an NPS gateway 200 that efficiently protects networks, in accordance with one or more aspects of the disclosure. The depicted steps are merely illustrative and may be omitted, combined, or performed in an order other than that depicted. The numbering of the steps is merely for ease of reference and does not imply any particular ordering may be necessary or preferred. For simplicity of description, the communications are shown as uni-directional flows, but in most cases the communications are actually bi-directional flows. Also, communications are composed of sequences of TCP/IP packets, but in the diagrams the plurality of packets are aggregated and represented as a single communication.

The threat intelligence gateway (TIG) 220 and cyber analysis systems 230, 232, 234 have already been configured with rules, as described above in the detailed description of FIG. 1 and in Step 3-1 and Step 3-2 of FIG. 2, which comprise the NPS gateway network protection policies. The rules may define filtering decisions or policies to be applied. The rules may define conditions in which certain protective actions, such as logging or blocking packets, are to be applied to received communications.

Figure 4:
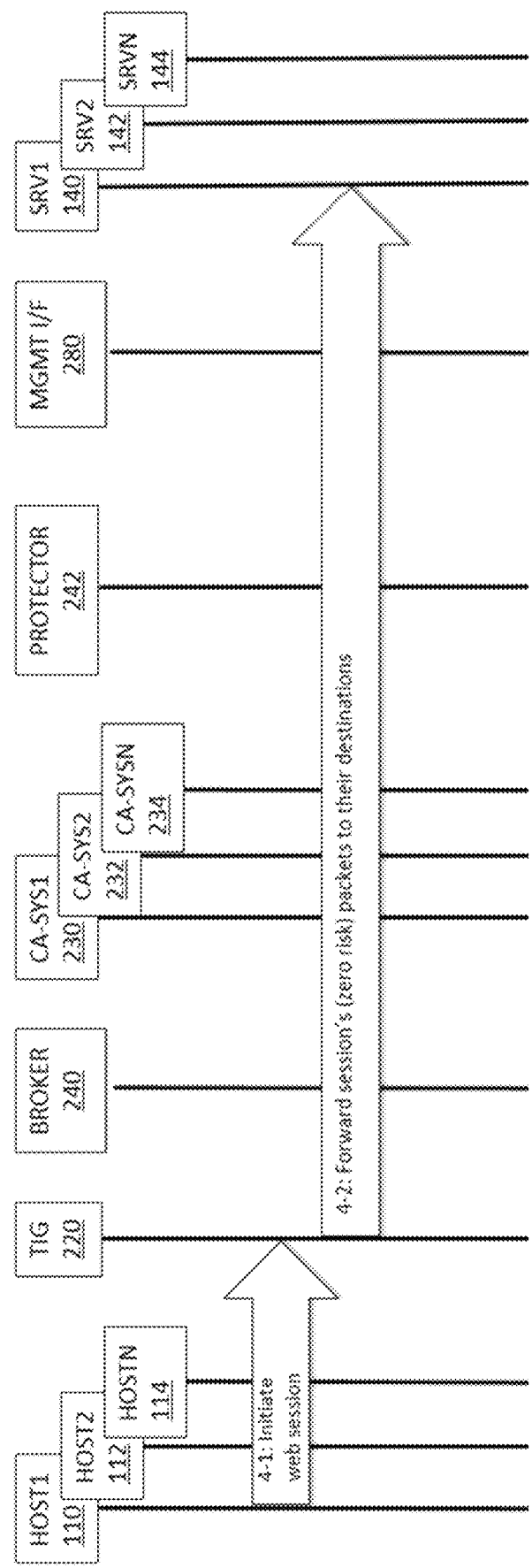
FIGS. 4, 5, 6, 7, 8, 9, and 10 depict example event sequences that illustrate methods for efficient, high-fidelity cyber analysis and associated network protections realized by an NPS gateway, in accordance with one or more illustrative aspects described herein.

FIG. 4 illustrates a process in which the NPS gateway 200 forwards zero-risk, benign/legitimate traffic without expending resources unnecessarily on cyber analysis. At Step 4-1, a web browser executing on a host HOST1 110 in network 102 initiates a session with a web server executing on a host SRV1 140 in network 104. The session packets ingress NPS gateway 200 and are received by TIG 220, which filters the packets through all of the CTI rules. When TIG 220 does not find any packets that match the CTI rules, TIG 220 determines that there may be zero threat risk and therefore no need for further analysis. Thus, at Step 4-2, TIG 220 forwards the session packets to their destinations (via the network interfaces 210 and 212).

Figure 5:
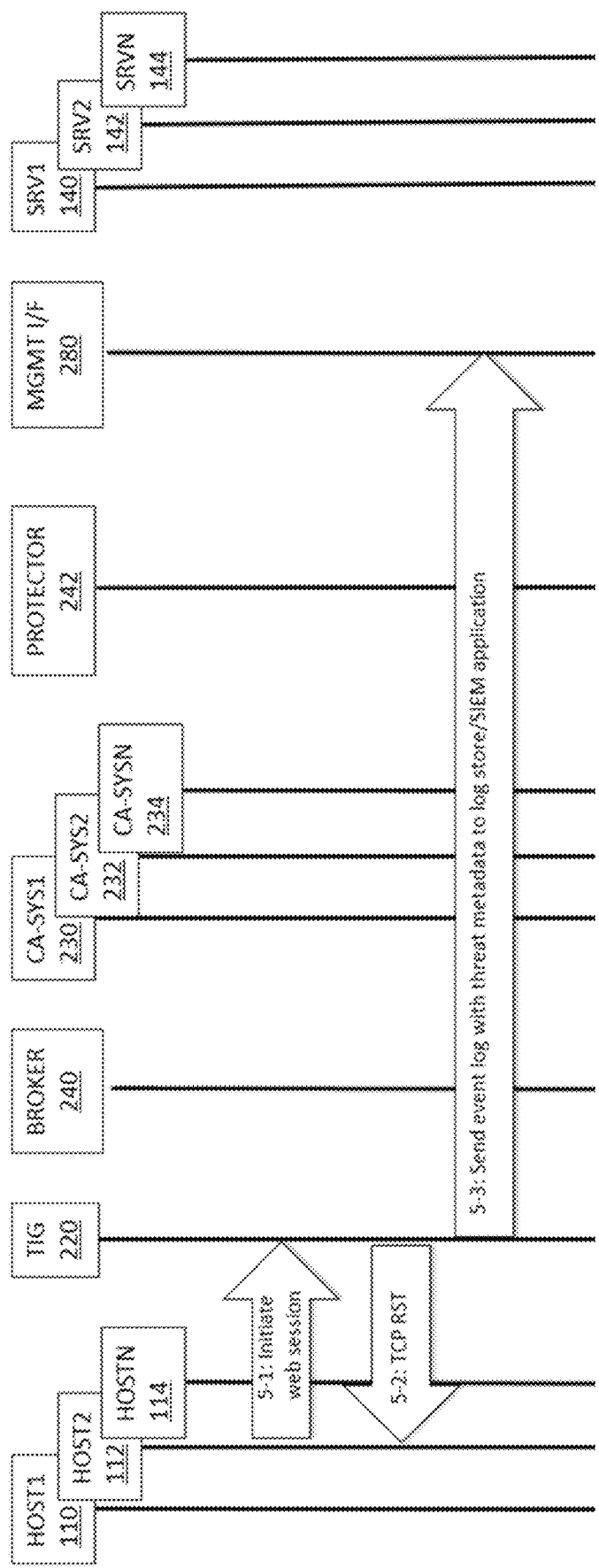

FIG. 5 illustrates a process in which the NPS gateway 200 blocks high-risk threat communications without expending resources unnecessarily on cyber analysis. At Step 5-1, a web browser executing on a host HOST2 112 in network 102 may initiate a session with a web server executing on a host SRV2 142 in network 104. The session packets ingress and are received by TIG 220, which may filter the packets through all of the CTI rules. TIG 220 may match a packet containing a URL with a (high-fidelity) URL rule for which the disposition is block. The TIG 220 drops the packet, thereby preventing it from reaching its destination host 142. At Step 5-2, TIG 220 may send a TCP RST packet to host 112 in order to tear down the associated TCP connection so that the web browser will not "hang" while waiting for the TCP connection to time out. At Step 5-3, TIG 220 may send a log of the event, which includes threat metadata, to a log storage device and a SIEM application or device (for reviewing and reporting), connected to network 102 via the management interface MGMT I/F 280.

Figure 6:
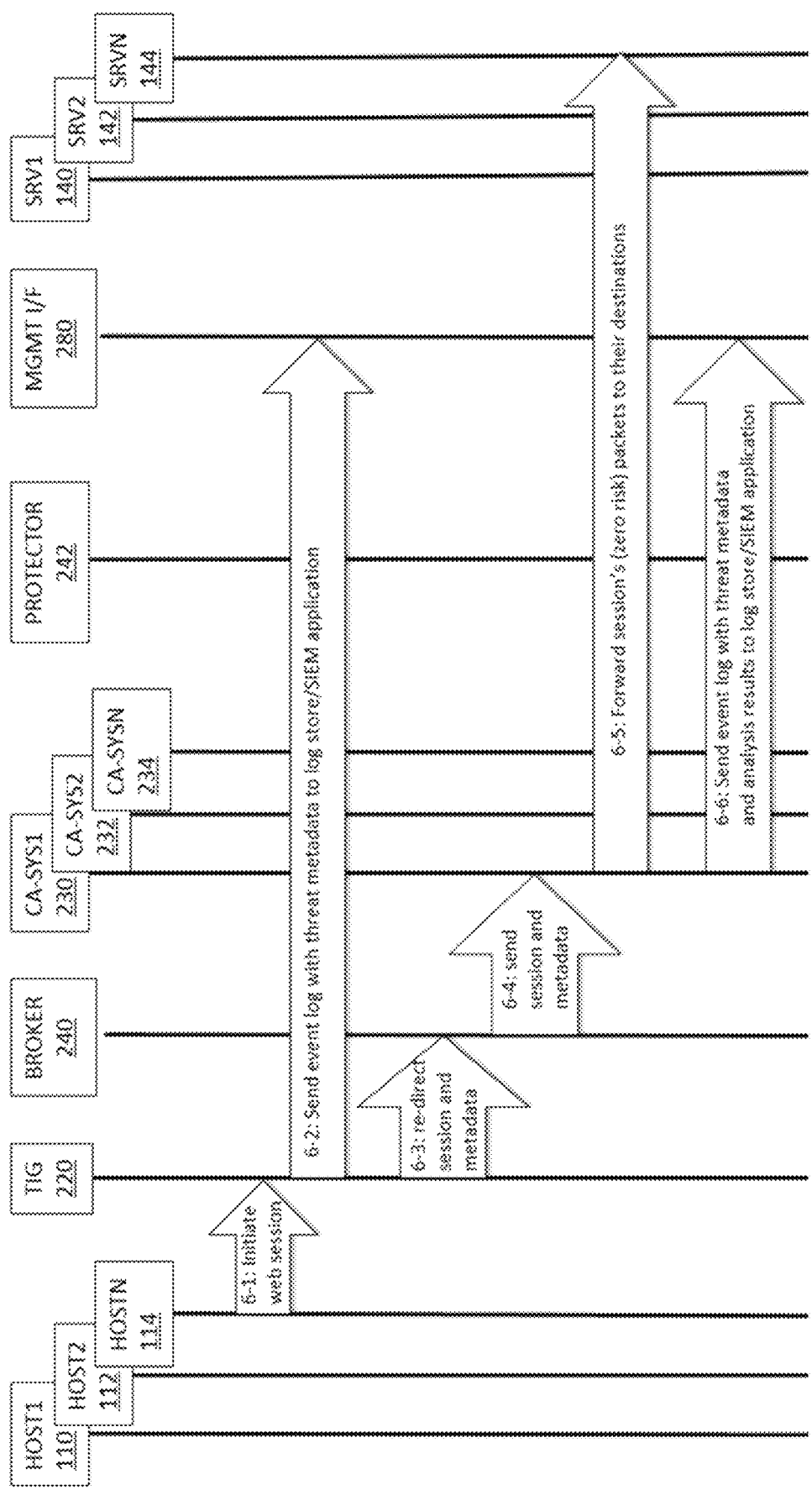

FIG. 6 illustrates a process in which the NPS gateway 200 first-stage TIG 220 re-directs a communication matching a medium-fidelity CTI rule to the second stage, where further targeted cyber analysis determines that the communication is benign/legitimate and forwards the communication to its destination. At Step 6-1, a web browser executing on a host HOSTN 114 in network 102 may initiate a session with a web server executing on a host SRVN 144 in network 104. The session packets ingress to TIG 220, which filters the packets through all of the CTI rules. TIG 220 may match a packet containing the web server fully qualified domain name (FQDN) with a (medium-fidelity) FQDN rule for which the disposition is re-direct (to the broker BROKER 240 for further analysis). At Step 6-2, TIG 220 may send a log of the event, which includes threat metadata and the re-direct disposition, to a log storage device and a SIEM device or application (for reviewing and reporting) connected to network 102 via the management interface MGMT I/F 280. At Step 6-3, the TIG 220 may re-direct the session communication data and the associated threat metadata to the broker 240. Based on the session protocol (such as, HTTP) and the threat metadata, the broker 240 may select, at Step 6-4, a cyber analysis system CA-SYS1 230. For example, the session communication data and the associated threat metadata may indicate that the potential threat type is credential harvesting. As such, the broker 240 may select a cyber analysis system which has been configured with signature rules for detecting web credential harvesting phishes, may perform further analysis on the session, and may send the session and metadata to cyber analysis system 230. The cyber analysis system 230 may apply rules for detecting credential harvesting to the session, and may determine that the session is not a threat/attack. Thus, at Step 6-5, system 230 may forward the session packets to their destinations (via the network interfaces 210 and 212). At Step 6-6, cyber analysis system 230 may send a log of the event, which may include threat metadata and the results of the analysis, to a log store and a SIEM device or application (for reviewing and reporting), connected to network 102 via the management interface MGMT I/F 280.

Figure 7:
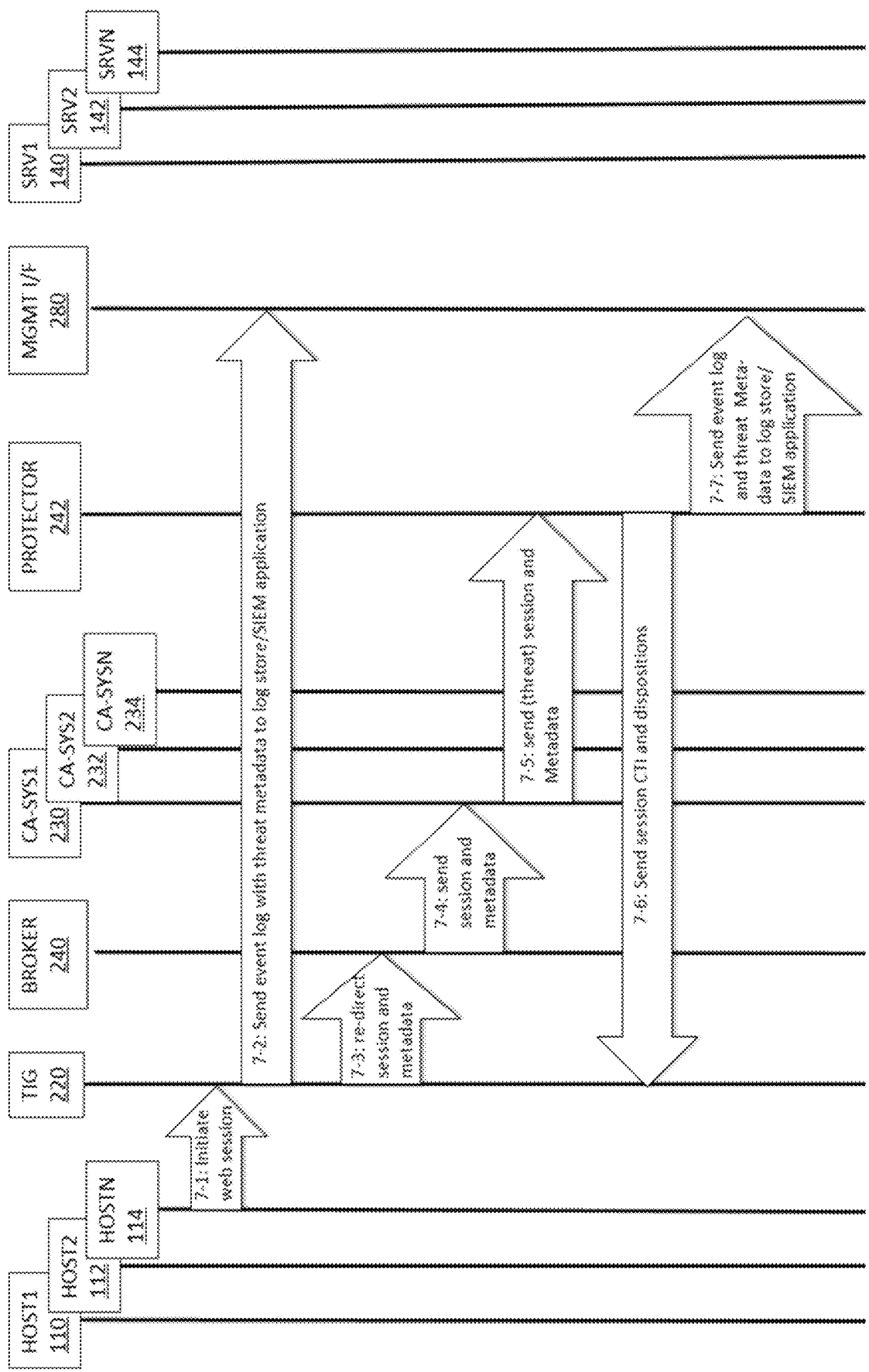

FIG. 7 illustrates a process in which the NPS gateway 200 first-stage TIG 220 re-directs a communication matching a medium-fidelity CTI rule to the second stage, where further targeted cyber analysis determines that the communication is an actual threat, and then the NPS gateway takes actions to protect the network. (Note: Steps 7-1 through 7-4 in FIG. 7 are the same as Steps 6-1 through 6-4 in FIG. 6). At Step 7-1, a web browser executing on a host HOSTN 114 in network 102 initiates a session with a web server executing on a host SRVN 144 in network 104. The session packets ingress TIG 220, which filters the packets through all of the CTI rules. TIG 220 matches a packet containing the web server fully qualified domain name (FQDN) with a (medium-fidelity) FQDN rule for which the disposition is re-direct (to the broker BROKER 240 for further analysis). At Step 7-2, TIG 220 may send a log of the event, which may include threat metadata and the re-direct disposition, to a log storage device and a SIEM device or application (for reviewing and reporting), connected to network 102 via the management interface MGMT I/F 280. At Step 7-3, the TIG 220 may re-direct the session communication data and the associated threat metadata to the broker 240. For example, based on the session protocol (HTTP) and the threat metadata which may say that the potential threat type is credential harvesting the broker 240 may select, at Step 7-4, cyber analysis system CA-SYS1 230, which may have been configured with signature rules for detecting web credential harvesting phishes, to perform further analysis on the session, and to send the session communication data and metadata to cyber analysis system 230.

A cyber analysis system, such as system 230, may apply rules for detecting credential harvesting to the session, and may determine that the session is a threat/attack. At Step 7-5, the system 230 may then forward the session packets and metadata to the network protector 242. The protector 242 may examine the metadata and may decide to actively protect network 102 by blocking the session (by dropping packets) to prevent the session packets (which may contain stolen credentials) from reaching their destination host 144. In Step 7-6, protector 242 may proactively protect network 102 by extracting CTI from the session—for example, the origin host 114 IP address, target domain name, target URL—and sending the CTI and dispositions to the TIG 220, which may generate new rules and may add them to its network protection policy. In Step 7-7, protector 242 may reactively protect network 102 by reporting the origin host 114 IP address and the attack type in the threat metadata, and may then send the log to a log storage unit and a SIEM device or application (for reviewing and reporting), connected to network 102 via the management interface MGMT I/F 280. Network authorities or management devices may then take protective actions. For example, network authorities or management devices may contact the origin host 114 or operator of the origin host 114 about the (thwarted) credential harvesting attack, and may educate the operator about how to prevent similar attacks in the future.

Figure 8:
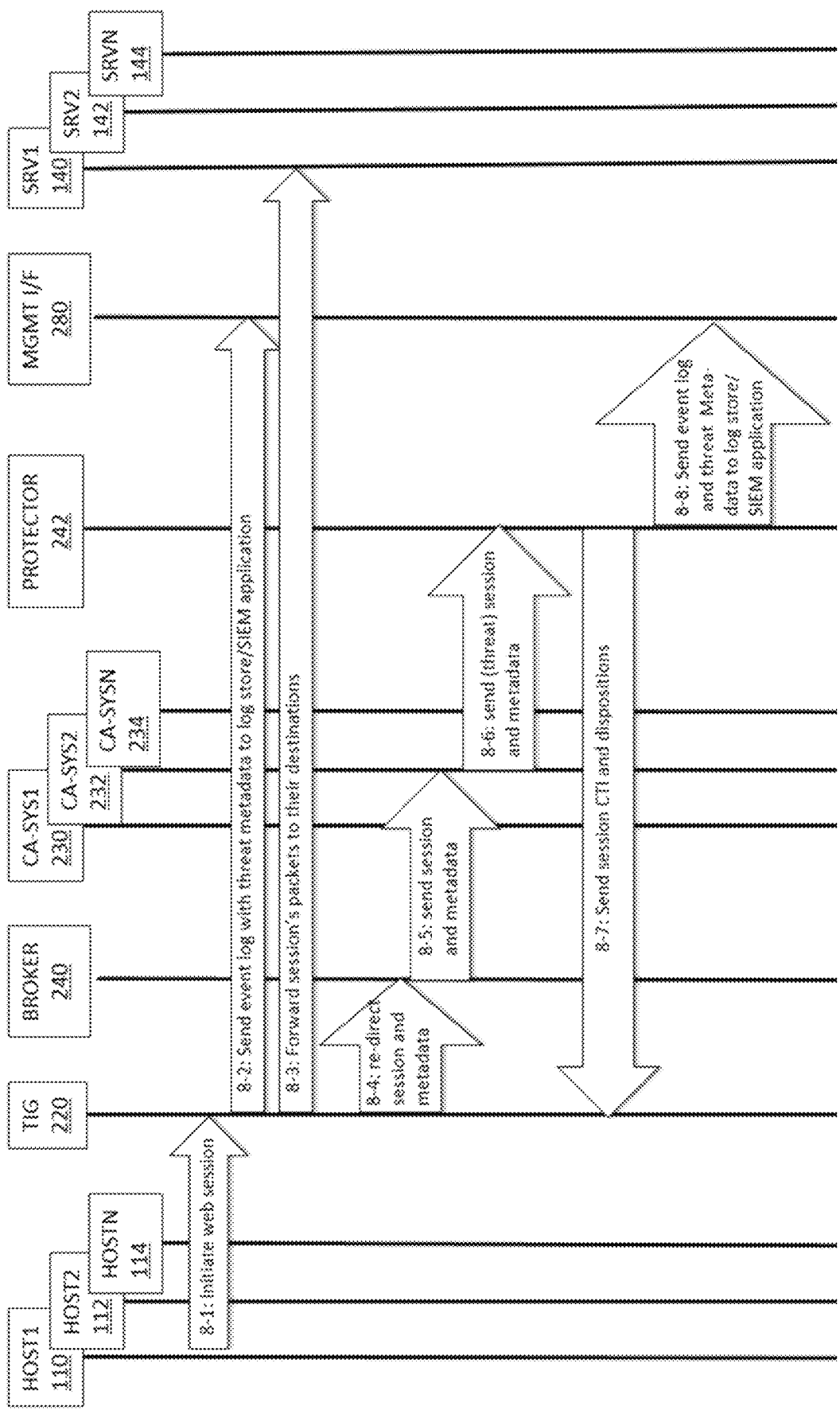

FIG. 8 illustrates a process in which the NPS gateway 200 first-stage TIG 220 processes a communication matching a low-fidelity CTI rule. The TIG 220 may log, capture, and mirror (e.g., copy, forward, and re-direct) a communication matching a low-fidelity CTI rule. The TIG 220 may forward the original communication or a first copy to its intended destination (because it is considered low-risk by the policy and rules), and may send a second copy of the communication to the second stage. At the second stage cyber analysis system, broadly scoped or targeted cyber analysis may determine that the communication is an actual threat. Since the communication data has been forwarded, the communication is determined to be a successful attack. Then, the NPS gateway 200 may take actions to protect the network, including notifying authorities, who may assess the damage by performing forensics on the captured communication, and take remedial actions.

At Step 8-1, a web browser executing on a host HOST1 110 in network 102 initiates a session with a web server executing on a host SRV1 140 in network 104. The session packets ingress to TIG 220, which may filters the packets through all of the CTI rules. TIG 220 may match a packet containing the web server IP address with a (low-fidelity) IP address rule. To ensure packets are processed in a timely manner, the TIG 220 may be configured to forward communications matching only a low-fidelity rule. The TIG 220 may also log the communications data and associated metadata, capture the data (e.g., store a copy of all of the communication packets, not shown in FIG. 8), and mirror the communication data (e.g., forward the original communication to its destination, and send a copy to the second-stage broker 240 for further analysis). At Step 8-2, TIG 220 sends a log of the event, which includes threat metadata and the capture and mirror dispositions, to a log store and a SIEM device or application (for reviewing and reporting), connected to network 102 via the management interface MGMT I/F 280. TIG 220 mirrors the communication by forwarding, at Step 8-3, the session communication data to its intended destination. The TIG 220, at Step 8-4, also transmits a copy of the session communication data and the associated threat metadata to the broker 240. Based on the session protocol (HTTP) and the (limited) threat metadata which may not have any threat type information because of the low fidelity of the CTI and because the CTI provider did not provide specific threat type information, the broker 240 may select, at Step 8-5, cyber analysis system CA-SYS2 232, which has been configured with a large, broadly scoped set of signature rules for detecting web/HTTP threats. The broker 240 may perform further analysis on the session communication data and may send the session communication data and metadata to cyber analysis system 232.

Cyber analysis system 232 may apply rules for detecting HTTP-mediated threats to the session, and determine that the session is a threat/attack. Thus, at Step 8-6, system 232 forwards the session packets and metadata to the network protector 242. The protector 242 may examine the metadata and may determine that it cannot actively protect network 102 by blocking the session communication data, because TIG 220 already forwarded the session/communication to its destination host 140. The protector 242 may determine that it can proactively protect network 102. To do so, protector 242, in Step 8-7, may extract CTI from the session communication data or metadata—for example, the IP address of origin host 110, the session target domain name and target URL—and may send the CTI and dispositions to the TIG 220. The TIG 220 may generate new rules based on the CTI and may add those generated rules to the TIG network protection policy. The protector 242 may also determine to reactively protect network 102. In Step 8-8, protector 242 reports, in the threat metadata, the IP address of origin host 110, the attack type, and an alert that the credential harvesting attack was successful. That data may be transmitted with a log to a log storage device and a STEM device or application (for reviewing and reporting), connected to network 102 via the management interface MGMT I/F 280. Network management devices and authorities may be alerted to the successful attack, may retrieve the capture of the session/attack, conduct forensic analysis to understand and assess the damage, and determine appropriate remedial actions, which may include contacting the operator of the origin host 110 and requiring the operator to change their credentials so that they are no longer useful to the attackers.

Figure 9:
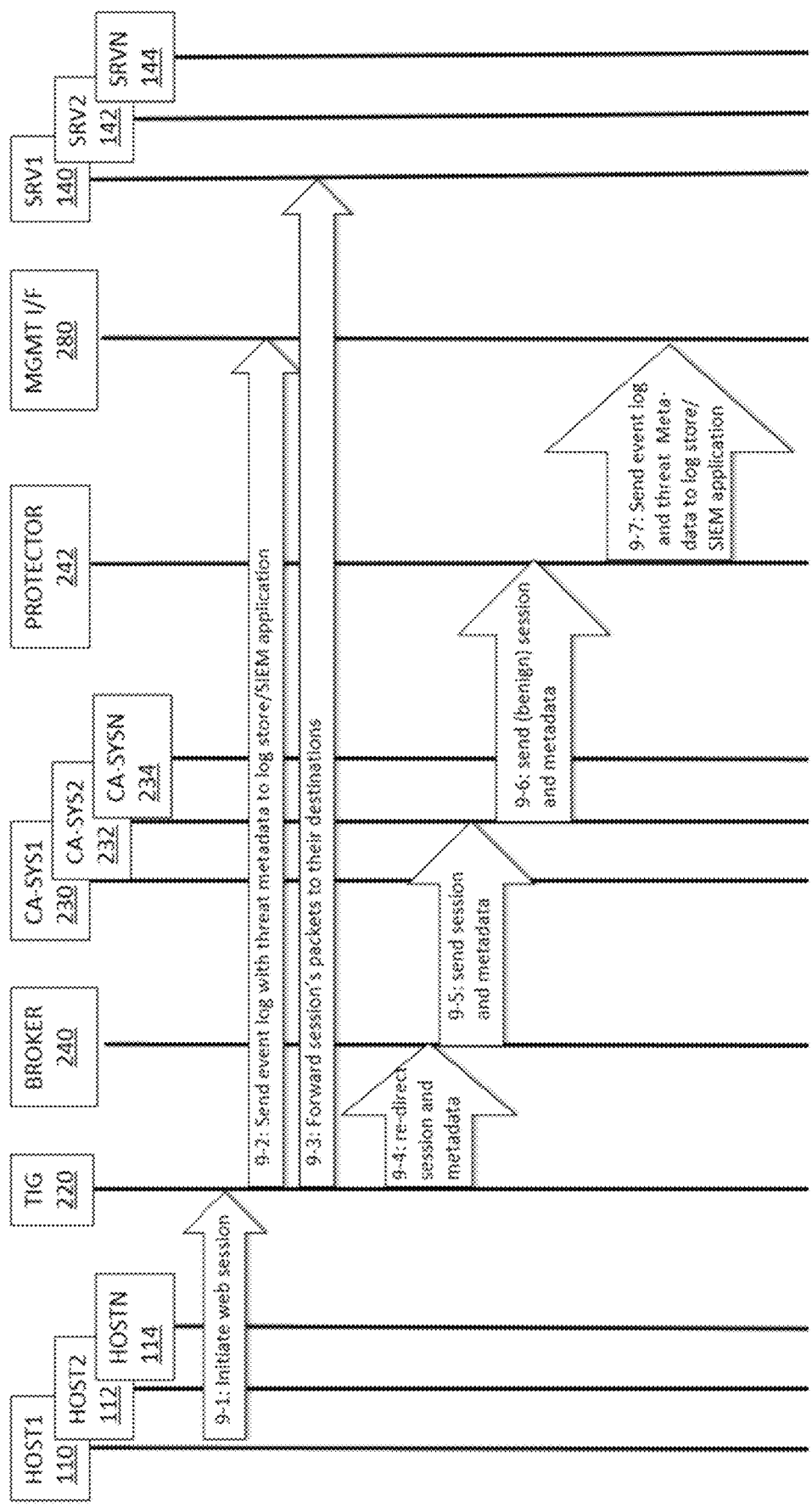

FIG. 9 illustrates a process in which the NPS gateway 200 first-stage TIG 220 may log, capture, and mirror (e.g., copies, forwards, and re-directs) communication data matching a low-fidelity CTI rule. The TIG 220 may forward the original communication to its intended destination (because it is considered low-risk by the TIG policy), and may send a copy of the communication to the second stage, where broadly scoped cyber analysis may determine that the communication is not a threat. After that determination, the second stage cyber analysis device of the NPS gateway 200 may report the false positive and other communications metadata to management devices and other authorities, which may implement changes to proactively refine the TIG policy.

Steps 9-1 through 9-5 are substantially similar to Steps 8-1 through 8-5 in FIG. 8, so detailed descriptions will not be repeated here. As noted above, in Step 8-5 (and similarly Step 9-5), the broker 240 selects cyber analysis system CA-SYS2 232, which may be configured with a large, broadly scoped set of signature rules for detecting web/HTTP threats, to perform further analysis on the session communication data and to send the session communication data and metadata to cyber analysis system 232.

Cyber analysis system 232 applies rules for detecting HTTP-mediated threats to the session, and determines that the session is a legitimate/benign communication (and not a threat/attack), and then updates the metadata accordingly. At Step 9-6, system 232 forwards the session communication packets and metadata to the network protector 242. The protector 242 may examine the metadata and determine that no active or reactive protective actions are necessary. However, as network management devices or network authorities may want to take some proactive measures related to refining the TIG policy, the protector 242 may update the metadata accordingly with CTI, and in Step 9-7 may send the log data to a log storage device and a SIEM device or application (for reviewing and reporting), connected to network 102 via the management interface MGMT I/F 280. Network management devices or authorities may review the event log(s) may decide to refine the TIG policy by, for example, adding a rule with the event URL as the (high-fidelity) CTI value and with a disposition of allow. This is a proactive measure that will not waste NPS gateway resources, particularly cyber analysis system resources, if a communications with the same URL occurs in the future.

Figure 10:
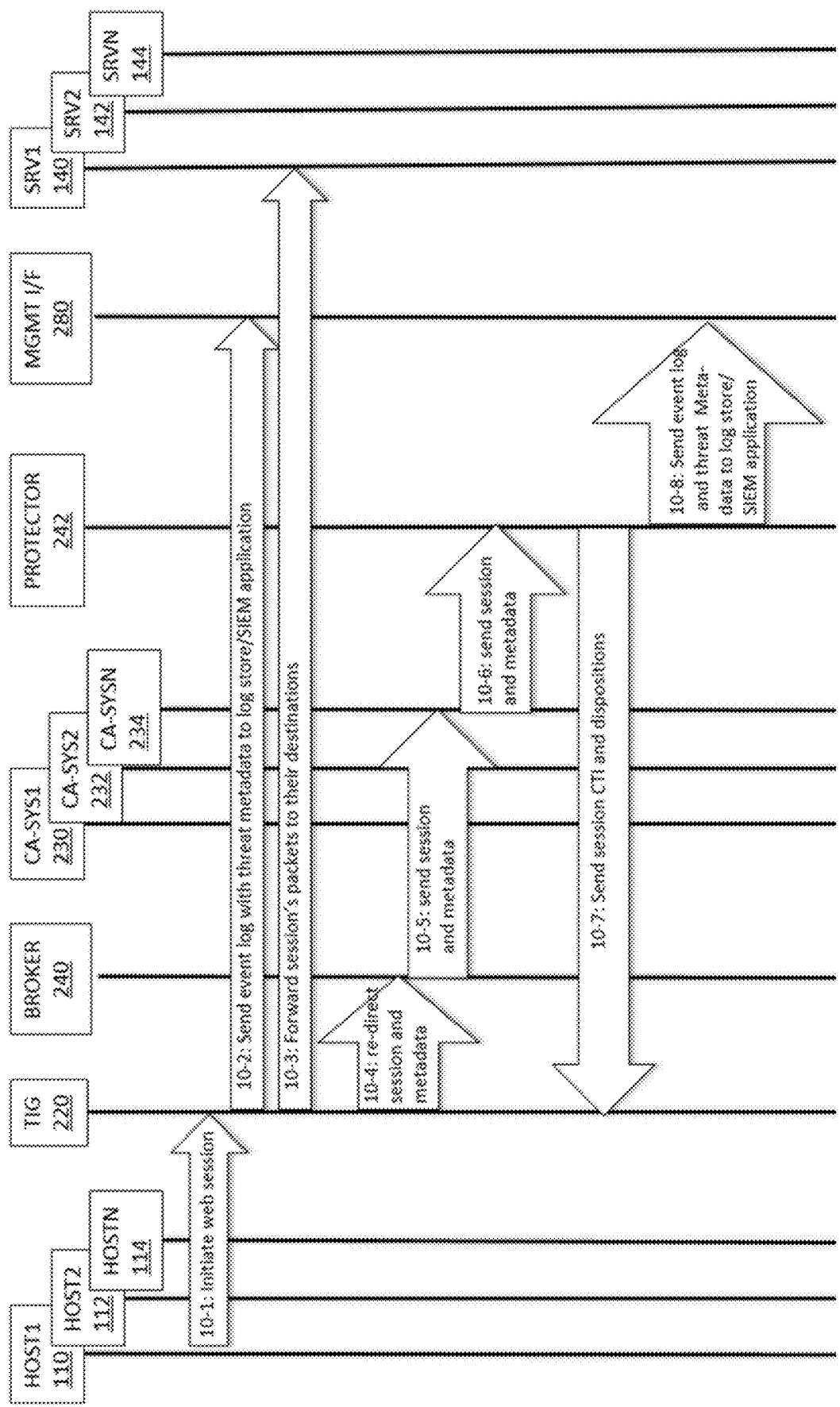

FIG. 10 illustrates a process in which the NPS gateway 200 first-stage TIG 220 may log, capture, and mirror (e.g., copies, forwards, and re-directs) a communication matching a low-fidelity CTI rule for malware downloads, and may forward the original communication to its destination (because it is considered low-risk by the TIG policy). The TIG 220 may send a copy of the communication to the second stage, where a malware analysis system determines that the communication contains a high-severity malware executable. Then the NPS gateway may transmit reports of the attack and other communications metadata, for example the network communications addressing and behavior, to network management devices authorities, who take action to proactively and reactively protect the network 102.

At Step 10-1, a web browser executing on a host HOST1 110 in network 102 initiates a session with a web server executing on a host SRV1 140 in network 104. The session packets ingress TIG 220, which filters the packets through all of the CTI rules. TIG 220 matches a packet containing the web server IP address with a (low-fidelity) IP address rule for which, since the TIG policy creators consider this CTI to be low-risk, the TIG 220 rule dispositions for session communication packets are to log, capture (e.g., store a copy of all of the communication packets, not shown in FIG. 10), and mirror (e.g., forward the original communication to its destination, and send a copy to the second-stage broker 240 for further analysis). At Step 10-2, TIG 220 may send a log of the event, which includes threat metadata that indicates the CTI may be associated with malware downloads, and the capture and mirror dispositions, to a log store and a SIEM application (for reviewing and reporting), connected to network 102 via the management interface MGMT I/F 280. TIG 220 may mirror the communication by, at Step 10-3, forwarding the session communication data to its intended destination. TIG 220 may, at Step 10-4, re-direct a copy of the session and the associated threat metadata to the broker 240. Based on the session protocol (HTTP) and other threat metadata which indicates that the communication may be a malware download, at Step 10-5, the broker 240 may select cyber analysis system CA-SYSN 234.

The selected cyber analysis system may be a malware analysis system 234 that works by detonating the malware in a sandbox (a security mechanism for separating running programs through virtualization and the like), and then recording the behavior of the malware. In particular, the selected cyber analysis system monitors and records network communications behavior of the suspected malware, including for example the DNS requests that the malware may issue, and may send the session communication data and metadata to malware analysis system 234. Malware analysis system 234 may then determine that the executable file is a malware.

After a determination that the executable file is a malware, system 234 forwards, at Step 10-6, the session communication packets and associated metadata to the network protector 242. The protector 242 may examine the metadata and may determine that it cannot actively protect network 102 by blocking the session, because TIG 220 already forwarded the session/communication (which includes the malware executable file) to an intended destination host 140. The protector 242, however, may proactively protect network 102. As such, in Step 10-7, protector 242 may extract CTI from the session—for example, the IP address of origin host 110, the session target domain name and target URL—and may also extract CTI from the malware execution. The protector 242 may sends the extracted CTI and dispositions to the TIG 220. The TIG 220 may generate new rules and may add the generated rules to the network protection policy.

The protector 242 may also reactively protect network 102. The protector 242 may therefore report, in Step 10-8, in the threat metadata, the IP address of origin host 110, the attack type, the malware executable filename, and an alert that the malware was successfully downloaded (onto host 110). The protector 242 may then send the log to a log storage device and a SIEM device or application (for reviewing, reporting, and alerting), connected to network 102 via the management interface MGMT I/F 280. Network management devices and authorities that are alerted to the successful attack may, for example, determine to isolate or quarantine host 110, preferably before host 110 executes the malware; remove the malware executable file from host 110; check the logs of host 110 to see if the malware was executed, and if so, then mitigate or otherwise remediate the damage caused by the malware; and/or take other actions to remove or isolate the malware or to remove or isolate the host from protected network.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Figure 11:
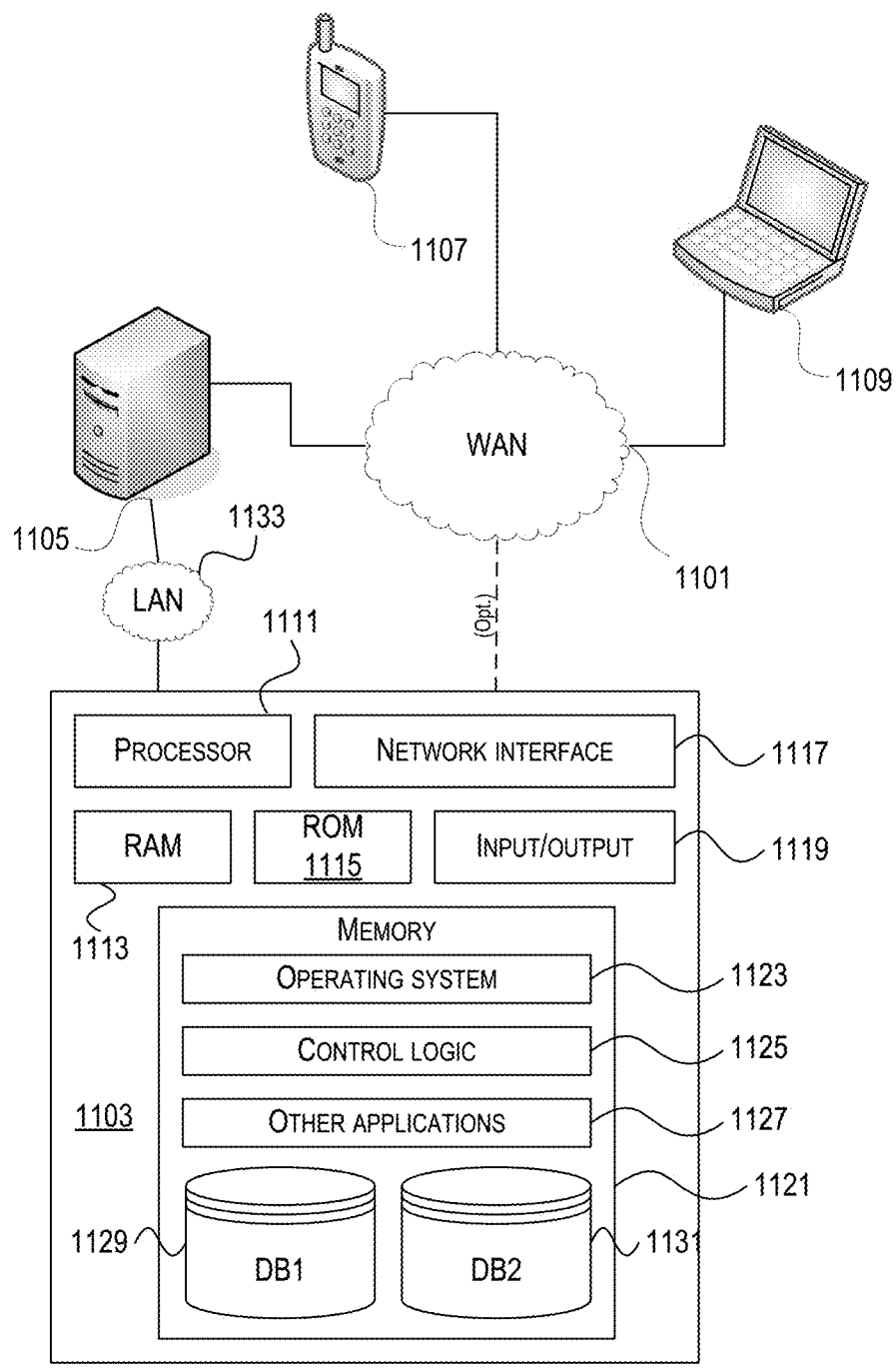
FIG. 11 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 11 illustrates one example of a system architecture and data processing device that may be used to implement one or more illustrative aspects described herein in a standalone and/or networked environment. Various network nodes 1103, 1105, 1107, and 1109 may be interconnected via a wide area network (WAN) 1101, such as the Internet. Other networks may also or alternatively be used, including private intranets, corporate networks, local area networks (LAN), metropolitan area networks (MAN), wireless networks, personal networks (PAN), and the like. Network 1101 is for illustration purposes and may be replaced with fewer or additional computer networks. A local area network 1133 may have one or more of any known LAN topology and may use one or more of a variety of different protocols, such as Ethernet. Devices 1103, 1105, 1107, and 1109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1103, web server 1105, and client computers 1107, 1109. Data server 1103 provides overall access, control and administration of databases and control software for performing one or more illustrative aspects describe herein. Data server 1103 may be connected to web server 1105 through which users interact with and obtain data as requested. Alternatively, data server 1103 may act as a web server itself and be directly connected to the Internet. Data server 1103 may be connected to web server 1105 through the local area network 1133, the wide area network 1101 (e.g., the Internet), via direct or indirect connection, or via some other network. Users may interact with the data server 1103 using remote computers 1107, 1109, e.g., using a web browser to connect to the data server 1103 via one or more externally exposed web sites hosted by web server 1105. Client computers 1107, 1109 may be used in concert with data server 1103 to access data stored therein, or may be used for other purposes. For example, from client device 1107 a user may access web server 1105 using an Internet browser, as is known in the art, or by executing a software application that communicates with web server 1105 and/or data server 1103 over a computer network (such as the Internet).

Servers and applications may be combined on the same physical machines, and retain separate virtual or logical addresses, or may reside on separate physical machines. FIG. 11 illustrates just one example of a network architecture that may be used, and those of skill in the art will appreciate that the specific network architecture and data processing devices used may vary, and are secondary to the functionality that they provide, as further described herein. For example, services provided by web server 1105 and data server 1103 may be combined on a single server.

Each component 1103, 1105, 1107, 1109 may be any type of known computer, server, or data processing device. Data server 1103, e.g., may include a processor 1111 controlling overall operation of the data server 1103. Data server 1103 may further include random access memory (RAM) 1113, read only memory (ROM) 1115, network interface 1117, input/output interfaces 1119 (e.g., keyboard, mouse, display, printer, etc.), and memory 1121. Input/output (I/O) 1119 may include a variety of interface units and drives for reading, writing, displaying, and/or printing data or files. Memory 1121 may further store operating system software 1123 for controlling overall operation of the data processing device 1103, control logic 1125 for instructing data server 1103 to perform aspects described herein, and other application software 1127 providing secondary, support, and/or other functionality which may or might not be used in conjunction with aspects described herein. The control logic may also be referred to herein as the data server software 1125. Functionality of the data server software may refer to operations or decisions made automatically based on rules coded into the control logic, made manually by a user providing input into the system, and/or a combination of automatic processing based on user input (e.g., queries, data updates, etc.).

Memory 1121 may also store data used in performance of one or more aspects described herein, including a first database 1129 and a second database 1131. In some embodiments, the first database may include the second database (e.g., as a separate table, report, etc.). That is, the information can be stored in a single database, or separated into different logical, virtual, or physical databases, depending on system design. Devices 1105, 1107, and 1109 may have similar or different architecture as described with respect to device 1103. Those of skill in the art will appreciate that the functionality of data processing device 1103 (or device 1105, 1107, or 1109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 12:
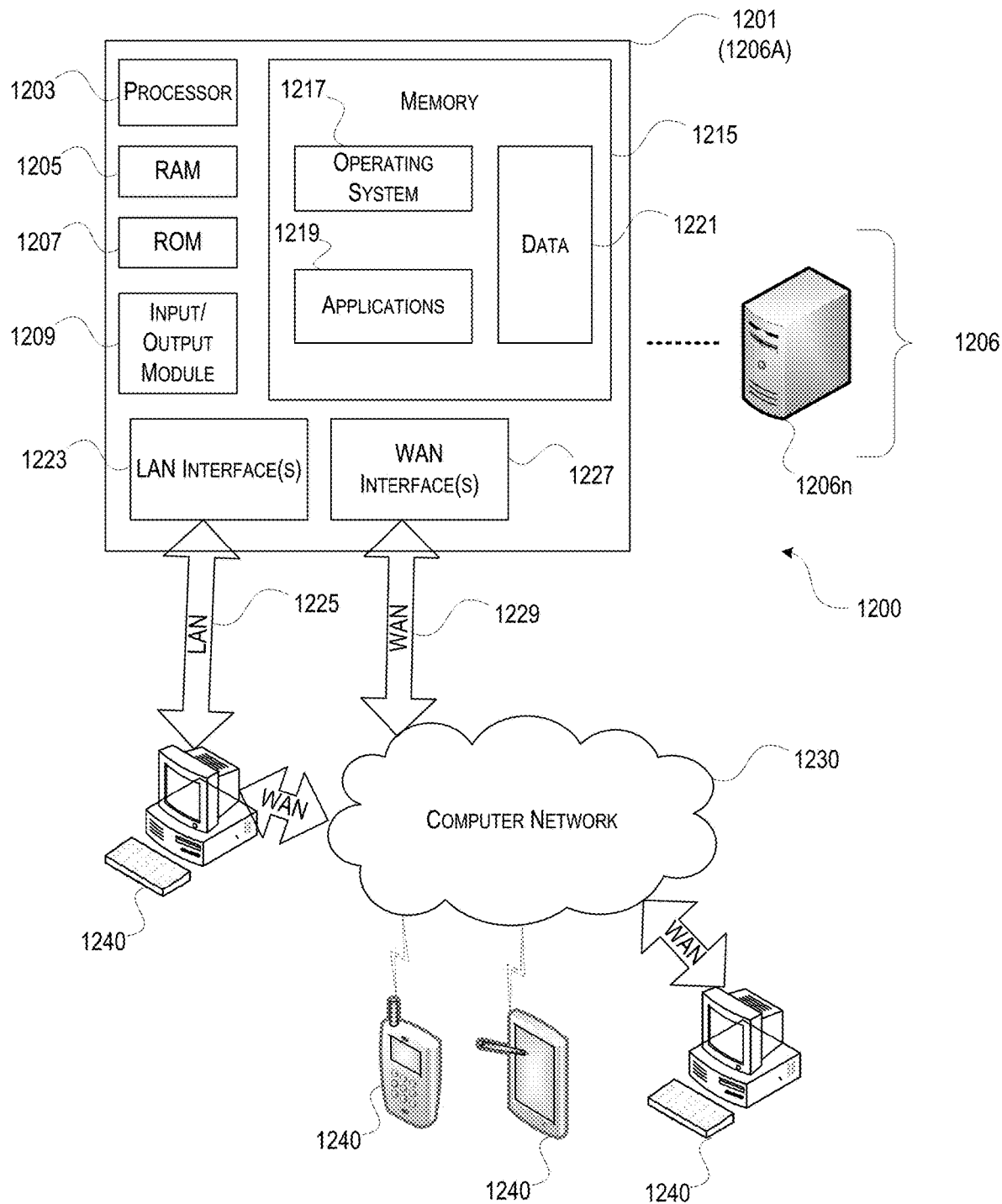
FIG. 12 depicts an illustrative remote-access system architecture that may be used in accordance with one or more illustrative aspects described herein.

With further reference to FIG. 12, one or more aspects described herein may be implemented in a remote-access environment. FIG. 12 depicts an example system architecture including a computing device 1201 in an illustrative computing environment 1200 that may be used according to one or more illustrative aspects described herein. Computing device 1201 may be used as a server 1206a in a single-server or multi-server desktop virtualization system (e.g., a remote access or cloud system) configured to provide virtual machines for client access devices. The computing device 1201 may have a processor 1203 for controlling overall operation of the server and its associated components, including RAM 1205, ROM 1207, Input/Output (I/O) module 1209, and memory 1215.

I/O module 1209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 1215 and/or other storage to provide instructions to processor 1203 for configuring computing device 1201 into a special purpose computing device in order to perform various functions as described herein. For example, memory 1215 may store software used by the computing device 1201, such as an operating system 1217, application programs 1219, and an associated database 1221.

Computing device 1201 may operate in a networked environment supporting connections to one or more remote computers, such as terminals 1240 (also referred to as client devices). The terminals 1240 may be personal computers, mobile devices, laptop computers, tablets, or servers that include many or all of the elements described above with respect to the computing device 1103 or 1201. The network connections depicted in FIG. 12 include a local area network (LAN) 1225 and a wide area network (WAN) 1229, but may also include other networks. When used in a LAN networking environment, computing device 1201 may be connected to the LAN 1225 through a network interface or adapter 1223. When used in a WAN networking environment, computing device 1201 may include a modem 1227 or other wide area network interface for establishing communications over the WAN 1229, such as computer network 1230 (e.g., the Internet). It will be appreciated that the network connections shown are illustrative and other means of establishing a communications link between the computers may be used. Computing device 1201 and/or terminals 1240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 12, one or more client devices 1240 may be in communication with one or more servers 1206a-1206n (generally referred to herein as "server(s) 1206"). In one embodiment, the computing environment 1200 may include a network appliance installed between the server(s) 1206 and client machine(s) 1240. The network appliance may manage client/server connections, and in some cases can load balance client connections amongst a plurality of backend servers 1206.

The client machine(s) 1240 may in some embodiments be referred to as a single client machine 1240 or a single group of client machines 1240, while server(s) 1206 may be referred to as a single server 1206 or a single group of servers 1206. In one embodiment a single client machine 1240 communicates with more than one server 1206, while in another embodiment a single server 1206 communicates with more than one client machine 1240. In yet another embodiment, a single client machine 1240 communicates with a single server 1206.

A client machine 1240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 1206, in some embodiments, may be referenced by any one of the following non-exhaustive terms: server(s), local machine; remote machine; server farm(s), or host computing device(s).

In one embodiment, the client machine 1240 may be a virtual machine. The virtual machine may be any virtual machine, while in some embodiments the virtual machine may be any virtual machine managed by a Type 1 or Type 2 hypervisor, for example, a hypervisor developed by Citrix, IBM, VMware, or any other hypervisor. In some aspects, the virtual machine may be managed by a hypervisor, while in other aspects the virtual machine may be managed by a hypervisor executing on a server 1206 or a hypervisor executing on a client 1240.

Some embodiments include a client device 1240 that displays application output generated by an application remotely executing on a server 1206 or other remotely located machine. In these embodiments, the client device 1240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 1206, in some embodiments, uses a remote presentation protocol or other program to send data to a thin-client or remote-display application executing on the client to present display output generated by an application executing on the server 1206. The thin-client or remote-display protocol can be a protocol such as the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 1206a-1206n such that the servers 1206a-1206n are logically grouped together into a server farm 1206, for example, in a cloud computing environment. The server farm 1206 may include servers 1206 that are geographically dispersed while and logically grouped together, or servers 1206 that are located proximate to each other while logically grouped together. Geographically dispersed servers 1206a-1206n within a server farm 1206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 1206 may be administered as a single entity, while in other embodiments the server farm 1206 can include multiple server farms.

In some embodiments, a server farm may include servers 1206 that execute a substantially similar type of operating system platform (e.g., WINDOWS, UNIX, LINUX, iOS, ANDROID, SYMBIAN, etc.) In other embodiments, server farm 1206 may include a first group of one or more servers that execute a first type of operating system platform, and a second group of one or more servers that execute a second type of operating system platform.

Server 1206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 1206a that receives requests from a client machine 1240, forwards the request to a second server 1206b (not shown), and responds to the request generated by the client machine 1240 with a response from the second server 1206b (not shown.) First server 1206a may acquire an enumeration of applications available to the client machine 1240 and well as address information associated with an application server 1206 hosting an application identified within the enumeration of applications. First server 1206a can then present a response to the client's request using a web interface, and communicate directly with the client 1240 to provide the client 1240 with access to an identified application. One or more clients 1240 and/or one or more servers 1206 may transmit data over network 1230, e.g., network 1101.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

We claim:

1. A method, comprising:
    receiving, by a computing device executing a threat analysis system, a first plurality of packets and threat metadata associated with the first plurality of packets;
    receiving, by the computing device executing the threat analysis system, a signal, wherein the signal indicates an analysis method for the first plurality of packets;
    analyzing, by the computing device executing the threat analysis system, the first plurality of packets using the indicated analysis method to determine a second plurality of packets, wherein the second plurality of packets comprises network traffic identified as a potential threat;
    determining, by the computing device executing the threat analysis system, at least one protection action for the second plurality of packets based on the signal, data associated with the second plurality of packets, and the received threat metadata; and
    processing, based on the determined at least one protection action, the second plurality of packets.

2. The method of claim 1, further comprising:
    receiving, by a gateway configured with a plurality of packet filtering rules, one or more packets associated with a network;
    filtering, by the gateway and using one or more of the plurality of packet filtering rules, the one or more packets to obtain the first plurality of packets; and
    generating, by the gateway, threat metadata associated with the first plurality of packets.

3. The method of claim 2, wherein the first plurality of packets comprise network traffic identified as a threat by the gateway.

4. The method of claim 1, further comprising:
    receiving, by a broker and from a gateway, the first plurality of packets and threat metadata associated with the first plurality of packets;
    selecting, by the broker, the threat analysis system from a plurality of threat analysis systems; and
    transmitting, by the broker to the threat analysis system, the first plurality of packets and threat metadata associated with the first plurality of packets.

5. The method of claim 4, wherein the broker transmits the signal, to the threat analysis system, that indicates the analysis method for the first plurality of packets.

6. The method of claim 1, wherein the threat metadata comprises at least one of a type of threat, a name of the threat, an identity of a threat actor, provenance information, risk scores, and a threat event identifier.

7. The method of claim 1, wherein the analysis method comprises at least one of signature analysis, anomalous behavior analysis, and malware execution analysis.

8. The method of claim 1, further comprising:
analyzing, by the threat analysis system, the first plurality of packets using the indicated analysis method to determine a third plurality of packets, wherein the third plurality of packets comprises network traffic identified as benign; and
forwarding the third plurality of packets toward their destination.

9. The method of claim 1, wherein analyzing, by the computing device executing the threat analysis system, the first plurality of packets using the analysis method further comprises:
updating, by the computing device executing the threat analysis system, the threat metadata associated with each of the first plurality of packets; and
generating a high-fidelity packet filtering rule based on the updated threat metadata associated with the first plurality of packets.

10. The method of claim 1, wherein the at least one protection action comprises at least one active protection, proactive protection, or reactive protection.

11. The method of claim 1, wherein the at least one protection action comprises:
quarantining an infected host device associated with at least one packet that has been identified as being a threat.

12. The method of claim 1, wherein the at least one protection action comprises:
forwarding the second plurality of packets to their destination; and
monitoring a flow of packets associated with the second plurality of packets.

13. The method of claim 1, further comprising:
generating a log of the second plurality of packets and the threat metadata associated with the second plurality of packets; and
transmitting the log to a management device.

14. A computing device executing a plurality of threat analysis systems comprising:
one or more processors; and
memory storing instructions that, when executed by the one or more processors, cause the computing device to:
receive a first plurality of packets and threat metadata associated with the first plurality of packets;
receive a signal, wherein the signal indicates an analysis method for the first plurality of packets;
analyze the first plurality of packets using the indicated analysis method to determine a second plurality of packets, wherein the second plurality of packets comprises network traffic identified as a potential threat;
determine at least one protection action for the second plurality of packets based on the signal, data associated with the second plurality of packets, and the received threat metadata; and
process, based on the determined at least one protection action, the second plurality of packets.

15. The computing device of claim 14, wherein the instructions further cause the computing device to:
receive, by a gateway configured with a plurality of packet filtering rules, one or more packets associated with a network;
filter, by the gateway and using one or more of the plurality of packet filtering rules, the one or more packets to obtain the first plurality of packets; and
generate, by the gateway, threat metadata associated with the first plurality of packets.

16. The computing device of claim 14, wherein the instructions further cause the computing device to:
receive, by a broker and from a gateway, the first plurality of packets and threat metadata associated with the first plurality of packets;
select, by the broker, a first threat analysis system from the plurality of threat analysis systems; and
transmit, by the broker to the first threat analysis system, the first plurality of packets, threat metadata associated with the first plurality of packets, and the signal that indicates the analysis method for the first plurality of packets.

17. The computing device of 14, wherein the instructions further cause the computing device to:
analyze the first plurality of packets using the indicated analysis method to determine a third plurality of packets, wherein the third plurality of packets comprises network traffic identified as benign; and
forward the third plurality of packets toward their destination.

18. The computing device of claim 14, wherein the instructions further cause the computing device to:
update the threat metadata associated with each of the first plurality of packets; and
generate a high-fidelity packet filtering rule based on the updated threat metadata associated with the first plurality of packets.

19. The computing device of claim 14, wherein the instructions further cause the computing device to:
quarantine an infected host device associated with at least one packet that has been identified as being a threat.

20. The computing device of claim 14, wherein the instructions further cause the computing device to:
forward the second plurality of packets to their destination; and
monitor a flow of packets associated with the second plurality of packets.

21. The computing device of claim 14, wherein the instructions further cause the computing device to:
generate a log of the second plurality of packets and the threat metadata associated with the second plurality of packets; and
transmit the log to a management device.

22. A non-transitory computer-readable medium comprising instructions that, when executed, cause a computing device executing a plurality of threat analysis systems to:
receive a first plurality of packets and threat metadata associated with the first plurality of packets;
receive a signal, wherein the signal indicates an analysis method for the first plurality of packets;
analyze the first plurality of packets using the indicated analysis method to determine a second plurality of packets, wherein the second plurality of packets comprises network traffic identified as a potential threat;
determine at least one protection action for the second plurality of packets based on the signal, data associated with the second plurality of packets, and the received threat metadata; and
process, based on the determined at least one protection action, the second plurality of packets.

23. The non-transitory computer-readable medium of claim 22, wherein the instructions, when executed, further cause the computing device to:
    receive, by a gateway configured with a plurality of packet filtering rules, one or more packets associated with a network;
    filter, by the gateway and using one or more of the plurality of packet filtering rules, the one or more packets to obtain the first plurality of packets; and
    generate, by the gateway, threat metadata associated with the first plurality of packets.

24. The non-transitory computer-readable medium of claim 22, wherein the instructions further cause the computing device to:
    receive, by a broker and from a gateway, the first plurality of packets and threat metadata associated with the first plurality of packets;
    select, by the broker, a first threat analysis system from the plurality of threat analysis systems; and
    transmit, by the broker to the first threat analysis system, the first plurality of packets, threat metadata associated with the first plurality of packets, and the signal that indicates the analysis method for the first plurality of packets.

25. The non-transitory computer-readable medium of claim 22, wherein the instructions further cause the computing device to:
    analyze the first plurality of packets using the indicated analysis method to determine a third plurality of packets, wherein the third plurality of packets comprises network traffic identified as benign; and
    forward the third plurality of packets toward their destination.

26. The non-transitory computer-readable medium of claim 22, wherein the instructions further cause the computing device to:
    update the threat metadata associated with each of the first plurality of packets; and
    generate a high-fidelity packet filtering rule based on the updated threat metadata associated with the first plurality of packets.

27. The non-transitory computer-readable medium of claim 22, wherein the instructions further cause the computing device to:
    quarantine an infected host device associated with at least one packet that has been identified as being a threat.

28. The non-transitory computer-readable medium of claim 22, wherein the instructions further cause the computing device to:
    forward the second plurality of packets to their destination; and
    monitor a flow of packets associated with the second plurality of packets.

29. The non-transitory computer-readable medium of claim 22, wherein the instructions further cause the computing device to:
    generate a log of the second plurality of packets and the threat metadata associated with the second plurality of packets; and
    transmit the log to a management device.

30. A system comprising:
    a gateway configured with a plurality of packet filtering rules; and
    a computing device executing a plurality of threat analysis systems,
    wherein the gateway is configured to:
      receive one or more packets associated with a network;
      filter, using the one or more of the plurality of packet filtering rules, the one or more packets to obtain a first plurality of packets; and
      generate, by the gateway, threat metadata associated with the first plurality of packets; and
    wherein the computing device, executing the plurality of threat analysis systems, is configured to:
      receive the first plurality of packets and the threat metadata associated with the first plurality of packets;
      receive a signal, wherein the signal indicates an analysis method for the first plurality of packets;
      analyze the first plurality of packets using the indicated analysis method to determine a second plurality of packets, wherein the second plurality of packets comprises network traffic identified as a potential threat;
      determine at least one protection action for the second plurality of packets based on the signal, data associated with the second plurality of packets, and the received threat metadata; and
      process, based on the determined at least one protection action, the second plurality of packets.

31. The system of claim 30, further comprising a broker configured to:
    receive, from the gateway, the first plurality of packets and the threat metadata associated with the first plurality of packets;
    select a first threat analysis system from the plurality of threat analysis systems; and
    transmit, to the first threat analysis system, the first plurality of packets, the threat metadata associated with the first plurality of packets, and the signal that indicates the analysis method for the first plurality of packets.

32. The system of claim 30, wherein the computing device is further configured to:
    analyze the first plurality of packets using the indicated analysis method to determine a third plurality of packets, wherein the third plurality of packets comprises network traffic identified as benign; and
    forward the third plurality of packets toward their destination.

33. The system of claim 30, wherein the computing device is further configured to:
    update the threat metadata associated with each of the first plurality of packets; and
    generate a high-fidelity packet filtering rule based on the updated threat metadata associated with the first plurality of packets.

34. The system of claim 30, wherein the computing device is further configured to:
    quarantine an infected host device associated with at least one packet that has been identified as being a threat.

35. The system of claim 30, wherein the computing device is further configured to:
    forward the second plurality of packets to their destination; and
    monitor a flow of packets associated with the second plurality of packets.

36. The system of claim 30, wherein the computing device is further configured to:
    generate a log of the second plurality of packets and the threat metadata associated with the second plurality of packets; and
    transmit the log to a management device.

* * * * *

UNITED STATES PATENT AND TRADEMARK OFFICE
CERTIFICATE OF CORRECTION

PATENT NO. : 11,290,424 B2
APPLICATION NO. : 16/406311
DATED : March 29, 2022
INVENTOR(S) : Sean Moore et al.

It is certified that error appears in the above-identified patent and that said Letters Patent is hereby corrected as shown below:

On the Title Page

On Page 4, Column 1, Other Publications, Line 41:
Delete "Architechture" and insert --Architecture--

On Page 4, Column 1, Other Publications, Line 46:
Delete "Alogrithm" and insert --Algorithm--

On Page 5, Column 1, Other Publications, Line 59:
Delete "Reporton" and insert --Report on--

On Page 5, Column 2, Other Publications, Line 62:
Delete "Aritcle" and insert --Article--

In the Claims

Column 26, Claim 17, Line 19:
After "computing device of", insert --claim--

Signed and Sealed this
Eighteenth Day of October, 2022

Katherine Kelly Vidal
*Director of the United States Patent and Trademark Office*